United States Patent
Ma et al.

(10) Patent No.: US 9,728,163 B2
(45) Date of Patent: Aug. 8, 2017

(54) OPERATION MODE SWITCHING METHOD AND ELECTRONIC DEVICE

(71) Applicant: Lenovo (Beijing) Co., Ltd., Beijing (CN)

(72) Inventors: Wenchao Ma, Beijing (CN); Dayong Gan, Beijing (CN); Xinru Hou, Beijing (CN); Shifeng Peng, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/743,428

(22) Filed: Jun. 18, 2015

(65) Prior Publication Data

US 2015/0287387 A1    Oct. 8, 2015

Related U.S. Application Data

(62) Division of application No. 13/780,539, filed on Feb. 28, 2013, now Pat. No. 9,093,012.

(30) Foreign Application Priority Data

Feb. 29, 2012    (CN) .......................... 2012 1 0050728
Sep. 3, 2012     (CN) .......................... 2012 1 0322689
Dec. 14, 2012    (CN) .......................... 2012 1 0545973

(51) Int. Cl.
G09G 5/10    (2006.01)
G09G 3/00    (2006.01)
(Continued)

(52) U.S. Cl.
CPC .............. *G09G 5/10* (2013.01); *G06F 3/013* (2013.01); *G06F 3/0412* (2013.01);
(Continued)

(58) Field of Classification Search
CPC ....... G09G 3/003; G09G 3/36; G09G 2354/00
See application file for complete search history.

(56) References Cited

U.S. PATENT DOCUMENTS

| | | |
|---|---|---|
| 5,526,022 A | 6/1996 | Donahue et al. |
| 8,235,529 B1 | 8/2012 | Raffle et al. |

(Continued)

FOREIGN PATENT DOCUMENTS

| | | |
|---|---|---|
| CN | 101266546 | 9/2008 |
| CN | 101441882 A | 5/2009 |

(Continued)

OTHER PUBLICATIONS

First Office Action dated Jun. 1, 2016 out of Chinese Priority Application No. 201210545973.4 (19 pages including English translation).

(Continued)

*Primary Examiner* — Liliana Cerullo
(74) *Attorney, Agent, or Firm* — Brinks Gilson & Lione; G. Peter Nichols

(57) ABSTRACT

An electronic device and an operation mode switching method thereof are described. The operation mode switching method is applied to an electronic device that includes a display unit, and the electronic device has a first operation mode and a second operation mode. The display unit has a first light-transmittance in the first operation mode and a second light-transmittance in the second operation mode such that the first high light-transmittance is higher than the second light-transmittance. The method includes detecting to obtain a trigger event; judging whether or not the trigger event satisfies a predefined condition to get a judgment result and, when the judgment result indicates that the trigger event satisfies the predefined condition, generating a switching instruction, and according to the switching (Continued)

instruction, switching the electronic device between the first operation mode and the second operation mode.

6 Claims, 14 Drawing Sheets

(51) Int. Cl.
    *G09G 3/36*     (2006.01)
    *G06F 3/01*     (2006.01)
    *G06F 3/041*     (2006.01)
    *G06F 3/0484*     (2013.01)
    *G06F 3/0488*     (2013.01)
    *G09G 5/00*     (2006.01)

(52) U.S. Cl.
    CPC ...... *G06F 3/04847* (2013.01); *G06F 3/04883* (2013.01); *G09G 3/003* (2013.01); *G09G 3/36* (2013.01); *G09G 5/003* (2013.01); *G09G 2300/023* (2013.01); *G09G 2300/0447* (2013.01); *G09G 2320/0261* (2013.01); *G09G 2354/00* (2013.01); *G09G 2360/145* (2013.01)

(56) References Cited

U.S. PATENT DOCUMENTS

| | | | |
|---|---|---|---|
| 8,826,184 | B2 | 9/2014 | Kwak |
| 2006/0017657 | A1 | 1/2006 | Yamasaki |
| 2008/0238880 | A1 | 10/2008 | Miwa |
| 2010/0182404 | A1 | 7/2010 | Kuno |
| 2010/0194705 | A1 | 8/2010 | Kim |
| 2011/0115880 | A1 | 5/2011 | Yoo |
| 2011/0304556 | A1 | 12/2011 | Harris |
| 2012/0001901 | A1 | 1/2012 | Park |
| 2012/0062444 | A1 | 3/2012 | Cok et al. |
| 2012/0206443 | A1 | 8/2012 | Kimura et al. |
| 2013/0083003 | A1 | 4/2013 | Perez et al. |
| 2013/0113973 | A1 | 5/2013 | Miao |
| 2013/0293503 | A1 | 11/2013 | Zhou |
| 2013/0335301 | A1* | 12/2013 | Wong .................. G02B 27/0093 345/8 |

FOREIGN PATENT DOCUMENTS

| | | |
|---|---|---|
| CN | 101794190 | 8/2010 |
| CN | 102214065 | 10/2011 |
| CN | 102239699 | 11/2011 |
| CN | 102262506 | 11/2011 |
| CN | 102316340 | 1/2012 |
| CN | 102395036 | 3/2012 |
| CN | 102541325 | 7/2012 |
| CN | 102668573 | 9/2012 |
| CN | 102779004 A | 11/2012 |

OTHER PUBLICATIONS

Second Office Action dated Mar. 23, 2016 (15 pages including English translation) out of Chinese priority Application No. 201210050728.6.

Office Action, and English language translation thereof, in corresponding Chinese Application No. 201210545973.4, dated Feb. 8, 2017, 19 pages.

Third Office Action dated Jun. 15, 2017 (17 pages including English translation) out of Chinese priority Application No. 201210545973.4/

* cited by examiner

FIG. I

OPERATION MODE SWITCHING METHOD AND ELECTRONIC DEVICE

This application is a divisional of U. S. application Ser. No. 13/780,539 filed on Feb. 28, 2013, which claims priority to Chinese Application No. 201210050728.6 filed on Feb. 29, 2012, Chinese Application No. 201210322689.0 filed on Sep. 3, 2012, and Chinese Application No. 201210545973.4 filed on Dec. 14, 2012; the entire contents of each are incorporated herein by reference.

The present invention relates to the field of display technology, in particular, relates to an operation mode switching method and an electronic device.

BACKGROUND

With the development of the electronics industry, electronic devices are becoming increasingly popular, people have invented a transparent screen (i.e., a screen, comprising a display unit with a light-transmittance lower than preset). A major highlight of a transparent screen is that, users not only can watch the content displayed on the screen, but also can see the area obscured by the transparent screen through the transparent screen, and people standing in front and back side of the transparent screen all can watch the contents on the display.

By way of example, for a spectacle-type electronic device, a user can directly wear it on eyes and watch content displayed on the lens-screen; therefore, it is convenient in use and is good in user experience; however, in the prior art, the transparency of the lens-screen of a spectacle-type electronic device is non-adjustable, and the transparency is low as manufactured; thus, when the user needs to see the surroundings, that is, needs to see the real world, he needs to take off this spectacle-type electronic device, such frequent takeoff-and-wear causes inconvenience to the user. Also, when using a phone or other electronic device containing a transparent screen, a user may not see clearly a corresponding picture displayed on the screen, thus the display effect of the electronic device is reduced. In addition, in the case of adjusting parameters of the touch screen, such as luminance, transparency, etc., typically, a user needs to find a settings menu in the menus, open the setting menu, and further in the setup menu, find corresponding parameter adjustment buttons, and then perform adjustment. Such gesture operations are rather tedious, and do not comply with custom of users, thereby resulting in poor user experience.

SUMMARY

The present invention provides an operation mode switching method and an electronic device, for addressing the technical problems of the existing electronic devices, which are tedious in operation mode switching, insufficient user-friendliness, and poor user experience.

According to one embodiment of the present invention, there is provided an operation mode switching method, characterized in that, the method is applied to an electronic device; the electronic device comprises a display unit, and the electronic device has a first operation mode and a second operation mode; the display unit has a first light-transmittance in the first operation mode and a second light-transmittance in the second operation mode; the first high light-transmittance is higher than the second light-transmittance, the method comprises: detecting to obtain a trigger event; judging whether or not the trigger event satisfies a predefined condition, to get a judgment result; when the judgment result indicates that the trigger event satisfies the predefined condition, generating a switching instruction; according to the switching instruction, switching the electronic device between the first operation mode and the second operation mode.

Preferably, said step of detecting to obtain a trigger event is: detecting a movement of a user's eyeball.

Preferably, said step of detecting a movement of a user's eyeball is: detecting a user's pupillary distance.

Preferably, the electronic device is a spectacle-type electronic device; the display unit comprises a lens; when the first operation mode is a real scene mode and the second operation mode is a terminal scene mode, by adjusting the transparency of the lens, the operation mode of the electronic device is switched.

Preferably, the electronic device is a spectacle-type electronic device; the display unit comprises a lens; when the first operation mode is a real scene mode and the second operation mode is a terminal scene mode, by partitioning the lens, the operation mode of the electronic device is switched.

Preferably, the electronic device is a spectacle-type electronic device; the display unit comprises a lens; the lens has an indicative mark thereon; when the movement of the user's eyeball is to look at the indicative mark, it is determined that the operation mode of the electronic device needs to be switched.

Preferably, when the first operation mode is a 2D mode and the second operation mode is a 3D mode, by adjusting the display mode of the display unit of the electronic device, the operation mode of the electronic device is switched.

Preferably, said step of detecting to obtain a trigger event is detecting a first application trigger command; said step of judging whether or not the trigger event satisfies a predefined condition to get a judgment result, is judging whether or not the first application is a predefined application, to get a judgment result; said step of generating a switching instruction when the judgment result indicates that the trigger event satisfies the predefined condition, is when the judgment result indicates that the first application is the predefined application, generating a switching instruction.

Preferably, after said step of detecting a first application trigger command, the method further comprises starting the first application; said step of switching the electronic device from the first operation mode to the second operation mode according to the switching instruction, comprises according to the switching instruction, switching the electronic device from the first operation mode to the second operation mode, and displaying a running result of the first application through the display unit in the second operation mode.

Preferably, the electronic device comprises an image acquisition unit; the predefined application is a starting application of the image acquisition unit.

Preferably, before said step of obtaining a trigger event, the method further comprises judging in the first operation mode whether or not the first light-transmittance is higher than a predefined light-transmittance; said step of judging whether or not the trigger event satisfies a predefined condition to get a judgment result, is if in the first operation mode, the first high light-transmittance is higher than a predefined light-transmittance, then judging whether or not the trigger event satisfies a predefined condition to get a judgment result; in the second operation mode, the second light-transmittance is lower than the predefined light-transmittance.

Preferably, the electronic device comprises a luminance sensor; the trigger event is the luminance sensor detects the luminance in the current scene; said step of judging whether or not the trigger event satisfies a predefined condition, is judging whether or not the luminance is higher than a preset luminance; if YES, then the predefined condition is satisfied.

Preferably, the electronic device comprises a space attitude sensor; the trigger event is the space attitude sensor detects the space attitude of the display unit in the current state; said step of judging whether or not the trigger event satisfies a predefined condition, is according to the space attitude, judging whether or not the angle between the plane of the display unit and a specified plane is less than a preset angle; if YES, then the predefined condition is satisfied.

Preferably, the electronic device comprises a first body and a second body; the display unit is located at the first body; said step of judging whether or not the trigger event satisfies a predefined condition, is judging whether or not the first body and the second body satisfy a preset positional relationship; if YES, then the predefined condition is satisfied.

Preferably, said step of detecting to obtain a trigger event is detecting a gesture operation performed by a user to the electronic device; said step of judging whether or not the trigger event satisfies a predefined condition to get a judgment result, is judging whether or not the gesture operation satisfies a first condition or a second condition; said step of generating a switching instruction when the judgment result indicates that the trigger event satisfies the predefined condition, is when the judgment result indicates that the gesture operation satisfies the first condition or the second condition, generating a switching instruction.

Preferably, when the judgment result indicates that the gesture operation satisfies the first condition, the switching instruction signifies switching to the first operation mode; when the judgment result indicates that the gesture operation satisfies the second condition, the switching instruction signifies switching to the second operation mode.

Preferably, said step of judging whether or not the gesture operation satisfies a first condition, comprises judging whether or not the touch point trajectory formed by the gesture operation is a continuous curve trajectory formed by going back and forth along a first sliding direction and a second sliding direction different from the first sliding direction; and said step of judging whether or not the gesture operation satisfies a second condition, comprises judging whether or not the touch point trajectory formed by the gesture operation is a continuous curve trajectory formed by going back and forth along a second sliding direction and a first sliding direction different from the second sliding direction.

According to one embodiment of the present invention, there is provided an electronic device, characterized in that, the electronic device comprises a display unit, and the electronic device has a first operation mode and a second operation mode; the display unit has a first light-transmittance in the first operation mode and a second light-transmittance in the second operation mode; the first high light-transmittance is higher than the second light-transmittance; the electronic device further comprises a detecting member, used for detecting to obtain a trigger event; and a processing unit, used for judging whether or not the trigger event satisfies a predefined condition, to get a judgment result; when the judgment result indicates that the trigger event satisfies the predefined condition, generating a switching instruction; according to the switching instruction, switching the electronic device between the first operation mode and the second operation mode.

Preferably, the detecting member detects a movement of a user's eyeball, wherein, said step of detecting a movement of a user's eyeball comprises detecting a user's pupillary distance.

Preferably, the electronic device is a spectacle-type electronic device; the display unit comprises a lens; the processing unit comprises an adjustment module; when the first operation mode is a real scene mode and the second operation mode is a terminal scene mode, the adjustment module adjusts the transparency of the lens, so that the operation mode of the electronic device is switched.

Preferably, the electronic device is a spectacle-type electronic device; the display unit comprises a lens; the processing unit comprises a lens partitioning unit; when the first operation mode is a real scene mode and the second operation mode is a terminal scene mode, the lens partitioning unit partitions the lens, so that the operation mode of the electronic device is switched.

Preferably, the electronic device is a spectacle-type electronic device; the display unit comprises a lens; the lens has an indicative mark thereon; when the detecting member detects that a movement of a user's eyeball is to look at the indicative mark, the processing unit determines that the operation mode of the electronic device needs to be switched.

Preferably, when the first operation mode is a 2D mode and the second operation mode is a 3D mode, the processing unit comprises a display mode switching unit, and the display mode switching unit is used to switch the display mode of the display unit, so as to switch the operation mode of the electronic device.

Preferably, the processor is also used for detecting a first application trigger command; judging whether or not the first application is a predefined application, to get a judgment result; when the judgment result indicates that the first application is the predefined application, generating a switching instruction.

Preferably, the processor is also used for starting the first application; according to the switching instruction, switching the electronic device from the first operation mode to the second operation mode, and displaying a running result of the first application through the display unit in the second operation mode.

Preferably, the electronic device further comprises an image acquisition unit; the predefined application is a starting application of the image acquisition unit.

Preferably, the processor is also used for judging in the first operation mode whether or not the first light-transmittance is higher than a predefined light-transmittance; if in the first operation mode, the first high light-transmittance is higher than a predefined light-transmittance, then judging whether or not the trigger event satisfies a predefined condition, to get a judgment result; in the second operation mode, the second light-transmittance is lower than the predefined light-transmittance.

Preferably, the electronic device further comprises a luminance sensor; the trigger event is the luminance sensor detects the luminance in the current scene; the processor is also used for judging whether or not the luminance is higher than a preset luminance; if YES, then the predefined condition is satisfied.

Preferably, the electronic device comprises a space attitude sensor; the trigger event is the space attitude sensor detects the space attitude of the display unit in the current state; the processing unit is also used for according to the space attitude, judging whether or not the angle between the plane of the display unit and a specified plane is less than a preset angle; if YES, then the predefined condition is satisfied.

Preferably, the electronic device comprises a first body and a second body; the display unit is located at the first body; the processor is also used for judging whether or not the first body and the second body satisfy a preset positional relationship; if YES, then the predefined condition is satisfied.

Preferably, the detecting member detects a gesture operation performed by a user to the electronic device; the processing unit is used for judging whether or not the gesture operation satisfies a first condition or a second condition; when the judgment result indicates that the gesture operation satisfies the first condition or the second condition, generating a switching instruction.

Preferably, when the judgment result indicates that the gesture operation satisfies the first condition, the switching instruction signifies switching to the first operation mode; when the judgment result indicates that the gesture operation satisfies the second condition, the switching instruction signifies switching to the second operation mode.

Preferably, the processing unit is used for judging whether or not the touch point trajectory formed by the gesture operation is a continuous curve trajectory formed by going back and forth along a first sliding direction and a second sliding direction different from the first sliding direction; and the processing unit is used for judging whether or not the touch point trajectory formed by the gesture operation is a continuous curve trajectory formed by going back and forth along a second sliding direction and a first sliding direction different from the second sliding direction.

Beneficial effects of the present invention are as follows:

An embodiment of the present invention, detects a movement of a user's eyeball, and according to movement of the eyeball, judges whether or not the operation mode of the electronic device needs to be switched, thus, without the need of the user's additional actions, it can control an electronic device only by a natural movement of the user's eyes; therefore, in one hand, because the user makes a natural movement, it is very convenient, more closer to the actual needs of users, and also more user-friendly; in the other hand, because of no requirement of additional devices such as a remote controller, the electronic device is simple in structure.

Further, an embodiment of the present invention, through an movement of a user's eye, adjusts the transparency of the lens of an electronic device, so as to switch the operation mode of the electronic device; therefore, it makes the adjustment operation easy, and makes the spectacle-type electronic device easier to be adjusted for freely switching between the surroundings and the electronic device scenes for a user to watch, thereby eliminating the need of frequent takeoff-and-wear.

Furthermore, an embodiment of the present invention, also has an indicative mark on the lens; when a user's sight line falls on the indicative mark, it is determined that the operation mode of the electronic device needs to be switched; when the sight line falls in the other portions of the lenses, switching is not triggered; in this way, erroneous switching can be avoided.

Furthermore, a user can use customary gestures, such as gestures like sweeping a glass, to adjust the parameters of the image displayed on the electronic device; thus, it is easy to learn and grasp, and easy to be operated by the user, thereby greatly improving user experience.

DETAILED DESCRIPTION OF THE PREFERRED EMBODIMENTS

Figure 1:
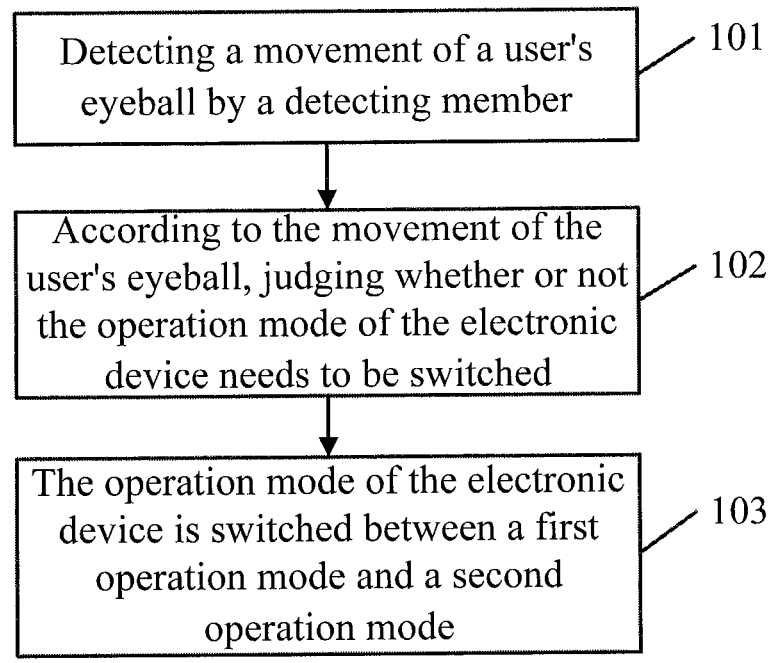
FIG. 1 is a flowchart of an operation mode switching method in an embodiment of the present invention.

An embodiment of the present invention provides an operation mode switching method, applied in an electronic device; the electronic device is, for example, a mobile phone, a tablet PC, a spectacle-type electronic device, or a handheld game console, or other electronic devices. The electronic device has a first operation mode and a second operation mode, and the electronic device further comprises a detecting member; with reference to FIG. 1, FIG. 1 is a flowchart of an operation mode switching method in an embodiment of the present invention, the method comprises:

Step 101: Detecting a movement of a user's eyeball by the detecting member;

Step 102: According to the movement of the user's eyeball, judging whether or not the operation mode of the electronic device needs to be switched;

Step 103: If YES, then, according to the movement of the eyeball, switching the electronic device between the first operation mode and the second operation mode.

In order to more clearly explain the technical solutions of the present invention, hereinafter, specific examples will be described in detail.

In a first embodiment, for example, when the electronic device is a spectacle-type electronic device; the spectacle-type electronic device comprises a lens and a structural member, such as a frame; the structural member facilitates a user to wear the spectacle-type electronic device on his eyes, while the detecting member, such as a camera provided on the structural member, facilitates detecting a movement of the user's eyeball; in this embodiment, for example, the lens displays an indicative mark thereon, so that when it is detected that the movement of the user is to look at the indicative mark, i.e. the user's sight line focuses on the indicative mark, it can be determined that the operation mode of the electronic device needs to be switched; the operation modes are, for example, a 2D mode and a 3D mode, alternatively, a real scene mode and a terminal scene mode.

Further, when a user's sight line focuses on the indicative mark, it can represent that the user's pupillary distance reaches a predefined value, thereby it can be determined which operation mode of the electronic device is to be switched, for example, when the first operation mode is a real scene mode and the second operation mode is a terminal scene mode, a small pupillary distance indicates that the eyes watches a close place, then the electronic device needs to be switched to the second operation mode; a large pupillary distance indicates watching a distant place, then the electronic device needs to be switched to the first operation mode. In this embodiment, the operation mode of the electronic device is switched by adjusting the transparency of the lens, which specifically is when the operation mode of the spectacle-type electronic device needs to be switched to the first operation mode, the transparency of the lens is adjusted higher, so that it is easy for the user to see surroundings, i.e., the real scene; when the operation mode of the spectacle-type electronic device needs to be switched to the second operation mode, the transparency of the lens is adjusted lower, so that it is easy for the user to see contents on the lens; in this way, it can avoid frequent takeoff-and-wear of the spectacle-type electronic device for a user.

In another embodiment, the operation mode of the spectacle-type electronic device is switched by partitioning the lens, for example, when the spectacle-type electronic device is in a first operation mode, and the focus of the user's sight line is on the indicative mark, this indicates that the operation mode of the spectacle-type electronic device needs to be switched to the second operation mode, and this can be accomplished by adjusting the transparency of the lens in partitions, for example, the transparency of the upper half of the lens is adjusted higher, and the transparency of the lower half of the lens is adjusted lower or remained unchanged, so that the user can directly view a real scene from the upper half of the lens, also can watch the content displayed on the lens through the lower half of the lens.

In another embodiment, the lens does not require any indicative mark, but only the detecting member is required to detect changes in the user's pupillary distance, such as calculating the pupillary distance; when the pupillary distance is less than a predefined value, it indicates that the user needs to see the content on the lens, whereas when the pupillary distance is greater than the predefined value, it indicates that the user needs to see the surrounding environment; for example, when the first operation mode is a real scene mode and the second operation mode is a terminal scene mode, a small pupillary distance indicates that the eyes watches a close place, then the electronic device needs to be switched to the second operation mode, whereas a large pupillary distance indicates watching a distant place, then the electronic device needs to be switched to the first operation mode. In this embodiment, the operation mode of the spectacle-type electronic device can be switched by adjusting the transparency of the lens, which specifically is when the operation mode of the spectacle-type electronic device needs to be switched to the first operation mode, the transparency of the lens is adjusted higher, so that it is easy for the user to see surroundings, i.e., the real scene; when the operation mode of the spectacle-type electronic device needs to be switched to the second operation mode, the transparency of the lens is adjusted lower, so that it is easy for the user to see contents on the lens; in this way, it can avoid frequent takeoff-and-wear of the spectacle-type electronic device for a user. Certainly, it is also possible to switch the operation mode of the electronic device by partitioning the lens, and this method has been explained in the foregoing description, which is therefore not specifically described here.

In another embodiment, the detection member does not need to calculate a pupillary distance, but only the movement of a user's eyeball is required to be detected, to determine whether the user's viewpoint is inside the contents of the lens or outside the contents; when the user's viewpoint detected is inside the content, the operation mode of the spectacle-type electronic device is switched to the terminal scene mode, whereas when the user's viewpoint detected is outside the content, the operation mode of the spectacle-type electronic device is switched to the real scene mode; also, it is possible to switch the operation mode of the spectacle-type electronic device by adjusting the transparency of the lens or by partitioning the lens, and these methods has been explained in the foregoing description, which are therefore not specifically described here.

In another embodiment, when the first operation mode is a 2D mode and the second operation mode is a 3D mode, the operation mode of the electronic device can be switched by adjusting the display mode of the display unit of the electronic device; for example, when the movement of a user's eye is to look at the indicative mark on the lens, the 3D mode is switched to the 2D mode, alternatively, for example, when the user's pupillary distance detected becomes small to a predefined value, the 2D mode is switched to the 3D mode; this embodiment is different from the aforementioned embodiments in that this embodiment involves different operation modes and a different switching mode (switching by adjustment the display mode of the lens); with the foregoing description of the above embodiments, the skilled in the art can clearly understand the method in this embodiment, which are therefore not specifically described here.

Figure 2:
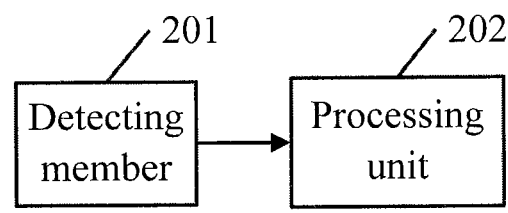
FIG. 2 is a functional block diagram of an electronic device in an embodiment of the present invention.

Another embodiment of the present invention further provides an electronic device; the electronic device has a first operation mode and a second operation mode; with reference to FIG. 2, FIG. 2 is a functional block diagram of the electronic device in this embodiment, and in FIG. 2, only the part associated with the invention is shown; the electronic device may also comprise other functional modules, such as a display unit and a input apparatus, etc. The electronic device comprises a detecting member 201, used for detecting a movement of a user's eyeball; and a processing unit 202, used for according to the movement of the user eyeball, judging whether or not the operation mode of the electronic device needs to be switched; If YES, then, according to the movement of the eyeball, the processing unit 202 switches the electronic device between the first operation mode and the second operation mode.

The detecting member 201 is, for example, a camera or other measurement instrument for measuring a movement of eyes, e.g. a centrometer, and the like.

In an embodiment, for example, when the electronic device is a spectacle-type electronic device, the spectacle-type electronic device comprises a lens and a structural member, such as a frame; the structural member facilitates a user to wear the spectacle-type electronic device on his eyes, while the detecting member, such as a camera provided on the structural member, facilitates detecting a movement of the user's eyeball Further, the lens displays an indicative mark thereon, so that when it is detected that the movement of the user is to look at the indicative mark, i.e. the user's sight line focuses on the indicative mark, it can be determined that the operation mode of the electronic device needs to be switched; the operation modes are, for example, a 2D mode and a 3D mode, alternatively, a real scene mode and a terminal scene mode.

In a further embodiment, the lens is a lens with variable transparency, so that when the first operation mode is a real scene mode and the second operation mode is a terminal scene mode, the operation mode of the spectacle-type electronic device can be switched by adjusting the transparency of the lens, which specifically is when the operation mode of the spectacle-type electronic device needs to be switched to the first operation mode, the transparency of the lens is adjusted higher, so that it is easy for the user to see surroundings, i.e., the real scene; when the operation mode of the spectacle-type electronic device needs to be switched to the second operation mode, the transparency of the lens is adjusted lower, so that it is easy for the user to see contents on the lens; in this way, it can avoid frequent takeoff-and-wear of the spectacle-type electronic device for a user.

In another embodiment, for example, when the spectacle-type electronic device is in a first operation mode, and it is determined that the operation mode of the spectacle-type electronic device needs to be switched to the second operation mode, and this can be accomplished by adjusting the transparency of the lens in partitions, for example, the transparency of the upper half of the lens is adjusted higher, and the transparency of the lower half of the lens is adjusted lower or remained unchanged, so that the user can directly view a real scene from the upper half of the lens, also can watch the content displayed on the lens through the lower half of the lens.

In another embodiment, the electronic device further comprises a display unit, and the processing unit comprises a display mode switching unit; and when the first operation mode is a 2D mode and the second operation mode is a 3D mode, the operation mode of the electronic device can be switched by adjusting the display mode of the display unit, for example, when the movement of a user's eye is to look at the indicative mark on the lens, the 3D mode is switched to the 2D mode, alternatively, for example, when the user's pupillary distance detected becomes small to a predefined value, the 2D mode is switched to the 3D mode.

In the above embodiments, when the electronic device is a spectacle-type electronic device, and when the second mode is a terminal scene mode, the user is viewing the content on the lenses of the spectacle-type electronic device; the content seen by the user may be directly displayed on the lenses, also may be a virtual display in the space, which is in a certain distance from the eyes of the user, so that the user will watch more comfortable; below, with reference to the drawings, preferred embodiments of the present invention will be described in detail. It should be noted that, in this specification and the drawings, essentially same steps and elements are represented with same reference numerals, and repeated explanation of these steps and elements will be omitted.

Figure 3:
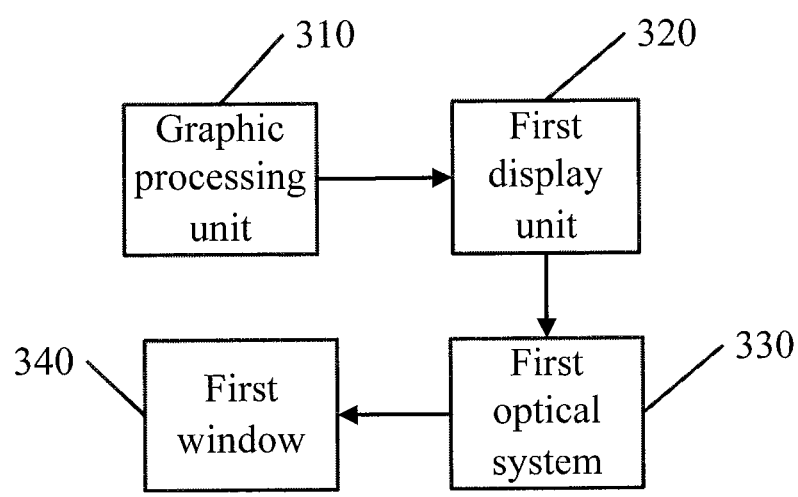
FIG. 3 is a functional block diagram of a spectacle-type electronic device in an embodiment of the present invention.

In the following embodiments of the present invention, FIG. 3 shows an exemplary block diagram of a spectacle-type electronic device 300 in accordance with an embodiment of the present invention. As shown in FIG. 3, the spectacle-type electronic device 300 comprises an image processing unit 310, a first display unit 320, a first optical system 330 and a first viewing window 340.

The image processing unit 310 can provide a first image. The first image is, for example, pictures, video images or texts, a combination of images, texts and pictures, etc. The image processing unit 310 may be a central processing unit (e.g. CPU) of the spectacle-type electronic device. Alternatively, it may be an image processing unit provided physically- or logically-independent.

The first display unit 320 can display the first image provided by the image processing unit 310. According to one example of the present invention, the first display unit 320 may be the micro display unit having a size less than the size of the screen of an existing electronic device. In the embodiment of the present invention, the size of the first display unit 320 is consistent with the size of the lens of the spectacle-type electronic device. The dimension of the lens matches the standard size of human eyes. In addition, according to another embodiment of the present invention, the first display unit 320 has a relatively high resolution. Specifically, the resolution of the screen of the first display unit 320 may be higher than the resolution of the screen of an existing electronic device. For example, the first display unit 320 may comply with the standard resolution of an HD or full-HD.

The first optical system 330 can receive the light emitted from the first display unit 320, and convert the optical path of the light emitted from the first display unit 320, to form a first enlarged virtual image, wherein the length of the optical path between the first optical system 330 and the first display unit 320 is smaller than the focal length of the first optical system. That is, the first optical system 330 has a positive refractivity. The magnification of the first optical system 330 may be preset. Alternatively, the first optical system 330 may comprise a first adjustment member to adjust the magnification of the first optical system 330, which will be described in detail later. The area of the first enlarged virtual image is greater than the area of the display region of the first display unit.

Figure 4A:
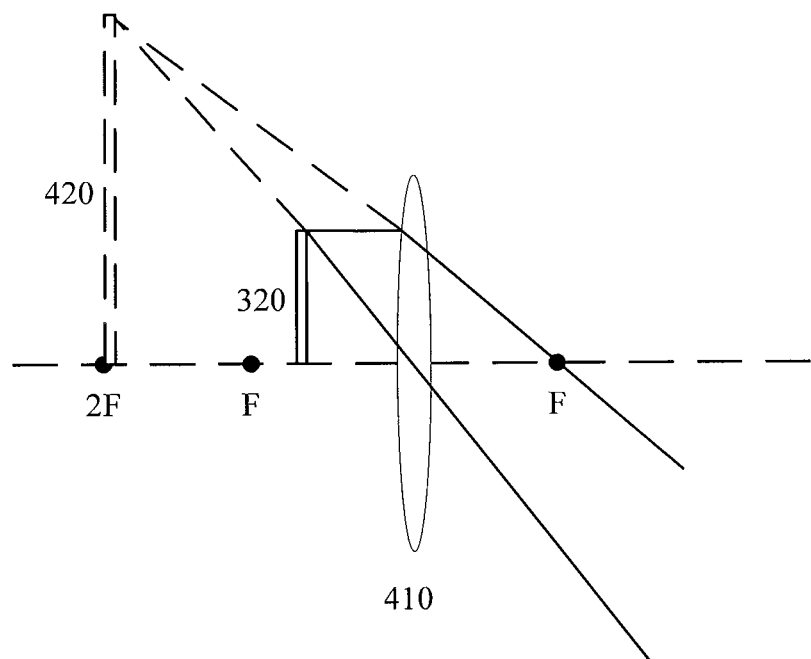
FIGS. 4a-4b are schematic diagrams of a principle of image enlargement in an embodiment of the present invention.

According to an example of the present invention, the first optical system 330 at least comprises a lens assembly having a positive refractivity. FIG. 4A is a schematic diagram showing a lens assembly in accordance with an example of the present invention. As shown in FIG. 2, the lens assembly may comprise a convex lens 210. The convex lens 210 can receive the light emitted from the first display unit 320, and convert the optical path of the light emitted from the first display unit 320, to form a first enlarged virtual image 220.

Although in FIG. 4A, the description is given, with one light line as an example, on converting the optical path of the light emitted from the first display unit 320; but it should be noted that, the light emitted from the first display unit 320 is actually a group of light rays constituted by a plurality of light rays, and the optical path of the group of light rays is converted through the lens 410, to form an enlarged virtual image 420.

Figure 4B:
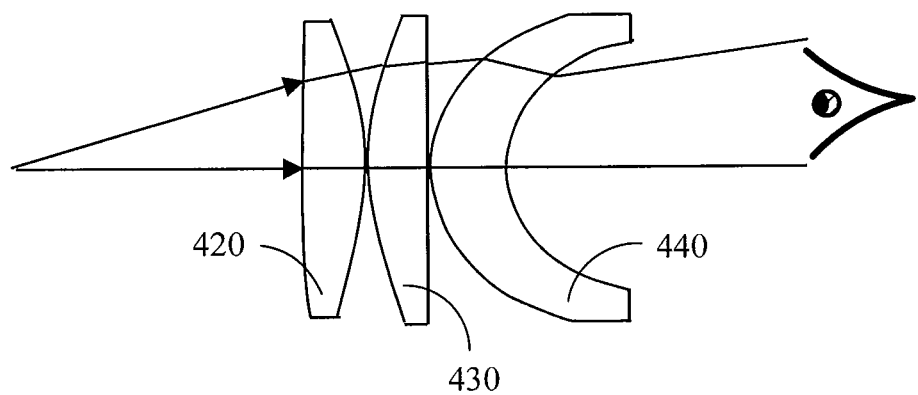

In addition, in order to reduce aberrations and avoid the interference of imaging caused by dispersion, and give user better visual experience, a plurality of lenses including concave and convex lens may be used to form a lens assembly. As described above, the lens assembly formed by the plurality of lenses has a positive refractivity, i.e., it can be equivalent to a convex lens. FIG. 4B is a schematic diagram showing another exemplary lens assembly according to the present invention. As shown in FIG. 4B, the lens assembly may comprise a single-convex lens 420, a single-convex lens 430 and a concave-convex lens 440.

The image processing unit 310, the first display unit 320 and the first optical system 330 may be provided in the interior of the spectacle-type electronic device 100. The first viewing window 340 may be provided on a first outer surface of the spectacle-type electronic device, so that when a user wears the spectacle type electronic device, the first viewing window 340 faces the user's eyes. The user can view through the first optical system to see the first enlarged virtual image. According to an example of the present invention, the size of the first viewing window 340 corresponds to the size of human eyes; preferably, the first viewing window 340 may be consistent with the size of the lens of the spectacle-type electronic device.

According to an example of the present invention, in the spectacle-type electronic device, the first display unit 320 is provided at one side of the first optical system 330, and the first optical system 330 allows the user standing at the other side of the optical system 330 opposite to the first display unit 320 to watch the first enlarged virtual image.

With the spectacles-type electronic device provided by the embodiment of the present invention, the size of the image that a user can watch is not restrained by the size of the lens (i.e. screen) itself of the spectacle-type electronic device; instead, the user can view through the spectacle-type electronic device to see a larger size of displayed image. In other words, when the user wears the spectacle-type electronic device, the size of the image that he sees is larger than the size of the lens (i.e., the size of the screen) of the spectacle-type electronic device, and at the same time, the distance of the displayed image that he sees is greater than the distance from his eyes to the lenses (the distance when the spectacle-type electronic device is worn).

Figure 5:
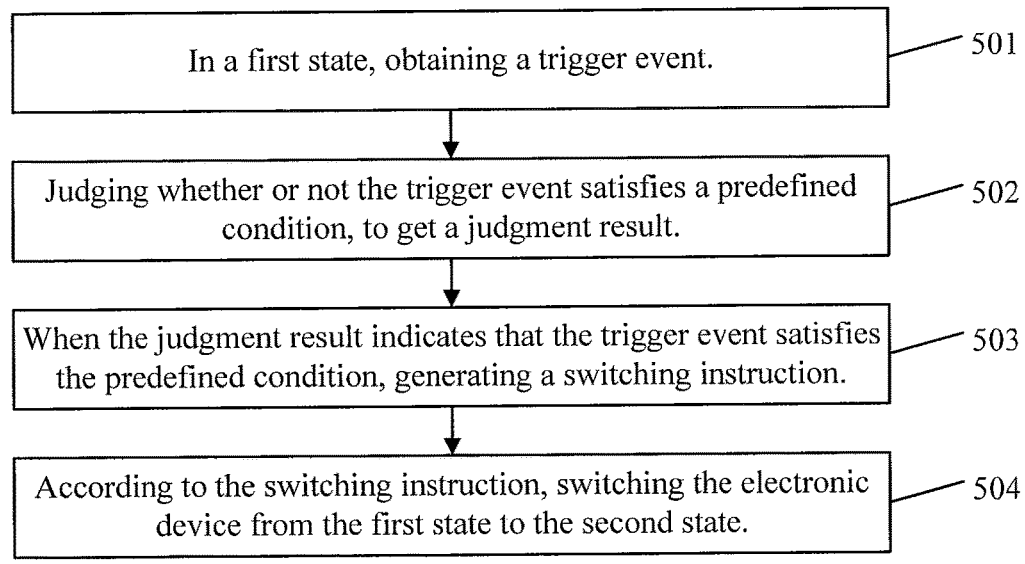
FIG. 5 is a flowchart of an operation mode switching method in another embodiment of the present invention.

This embodiment provides an operation mode switching method, which can be applied in an electronic device; the electronic device comprises a display unit, and the electronic device has a first operation mode and a second operation mode; the display unit has a first light-transmittance in the first operation mode and a second light-transmittance in the second operation mode; the first high light-transmittance is higher than the second light-transmittance As shown in FIG. 5, the method may comprise steps as follows:

501. In a first operation mode, obtaining a trigger events;
502. Judging whether or not the trigger event satisfies a predefined condition, to get a judgment result;
503. When the judgment result indicates that the trigger event satisfies the predefined condition, generating a switching instruction
504. According to the switching instruction, switching the electronic device from the first operation mode to the second operation mode.

With the above scheme, when the electronic device obtains a trigger event, and the trigger event obtained satisfies a predefined condition, then the electronic device is switched from the first operation mode to the second operation mode, wherein the first operation mode and the second operation mode have different light-transmittance; the electronic device can adjust the light-transmittance of the display unit according to the trigger event; that is, when the electronic device performs different operations, the light-transmittance of the display unit can be adjusted accordingly; in this way, the display effect of the electronic device is enhanced.

This embodiment provides another operation mode switching method, and the method is a development of the method shown in FIG. 5, and the method can be used in application situations as follows the luminance of the current scene where the electronic device locates may changes; if the luminance of the current scene is relatively high, then a user may not clearly see the images displayed by the electronic device; therefore, according to the luminance detected by a luminance sensor in the current scene, the state of the electronic device can be switched, that is, the light-transmittance of the display unit can be adjusted.

Figure 6:
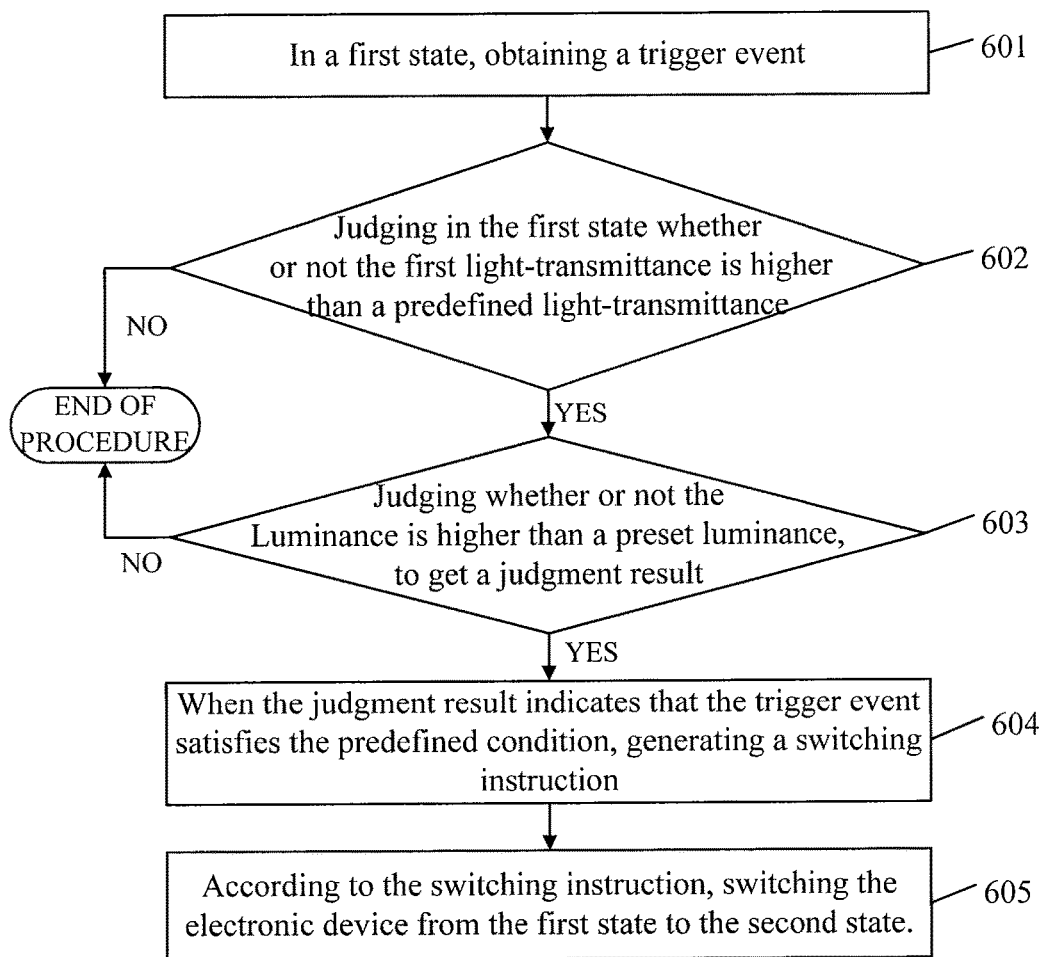
FIG. 6 is a flowchart of an operation mode switching method in an embodiment of the present invention, in which a trigger event is a luminance sensor detects luminance in a current scene.

As shown in FIG. 6, the method may comprise:
601. In a first state, obtaining a trigger event.

As one implementation of this embodiment, the electronic device may comprise a luminance sensor, and the trigger event may be, but not limited to the luminance sensor detects the luminance in the current scene.

The luminance sensor is not limited in this embodiment, and may be set according to an actual need, which is specifically described here.

602. Judging in the first operation mode whether or not the first light-transmittance is higher than a predefined light-transmittance. If YES, then proceeds to step 603; if NO, then the procedure ends.

As one implementation of this embodiment, the step of judging in the first operation mode whether or not the first light-transmittance is higher than a predefined light-transmittance may be judging whether or not the display unit is transparent. If it is transparent, then executing the subsequent steps; if not transparent, then the procedure ends, that is, the light-transmittance of the display unit is not to be adjusted.

That is, the condition that the light-transmittance of the display unit is higher than a default light-transmittance (or the display unit is transparent), may be a prerequisite for switching the state of the electronic device or for adjusting the light-transmittance of the display unit.

To judge whether or not he first light-transmittance higher than a predefined light-transmittance, firstly, the first light-transmittance needs to be obtained; methods for obtaining the first light-transmittance may include, but not limited to the first light-transmittance is obtained by detecting the voltage applied to the display unit (because the value of the light-transmittance of the display unit can be controlled by the voltage applied to the display unit).

The method for obtaining light-transmittance is not limited in this embodiment, and may be any method known by the skilled in the art, which is specifically described here.

It should be noted that, this embodiment may not comprise step 602, and may execute step 603 directly after step 601 is executed. In the implementations below, that step also may not be included, and may be set according to the actual needs, which is specifically described here.

603. Judging whether or not the luminance is higher than a predefined luminance, to get a judgment result; if YES, then the predefined condition is satisfied; if NO, then the predefined condition is not satisfied. If the predefined condition is satisfied, then executes step 604; if the predefined condition is not satisfied, then the procedure ends.

As one implementation of this embodiment, the step of judging whether or not the trigger event satisfies a predefined condition, may be, but not limited to Judging whether or not the luminance detected by the luminance sensor is higher than a predefined luminance; if YES, then the predefined condition is satisfied, i.e. the judgment result may indicates that the trigger events satisfies a predefined condition; if NO, then the predefined condition is not satisfied, i.e. the judgment result may indicates that the trigger events does not satisfy a predefined condition.

The value of the predefined luminance is not limited in this embodiment, and may be set according to an actual need, which is specifically described here.

604. When the judgment result indicates that the trigger events satisfies the predefined condition, generating a switching instruction.

605. According to the switching instruction, switching the electronic device from the first operation mode to the second operation mode.

The electronic device is switched from the first operation mode to the second operation mode, that is, the display unit is adjusted from the first light-transmittance to the second light-transmittance, wherein the first high light-transmittance is higher than the second light-transmittance.

As one implementation of this embodiment, if the trigger event satisfies the predefined condition, then this indicates that the luminance of the scene where the electronic device currently locates is relatively high, and this may result in that a user cannot see clearly the image displayed on the electronic device, thus the light-transmittance of the display unit is reduced; if the trigger event does not satisfy the predefined condition, then the luminance of the scene where the electronic device currently locates is appropriate, thus the light-transmittance of the display unit may not need to change.

Further alternatively, the electronic device also can judge whether or not the luminance of the current scene is lower than the predefined luminance; if YES, then the predefined condition is not satisfied; if NO, then the predefined condition is satisfied.

The method for judging whether or not the trigger event satisfies a predefined condition, is not limited in this embodiment, and may be set according to an actual need, which is specifically described here.

Figure 7:
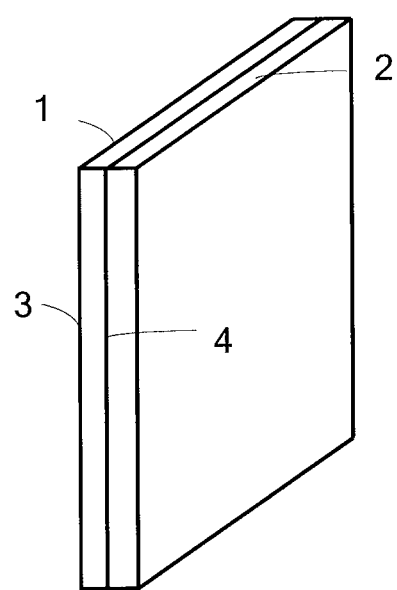
FIG. 7 is a schematic structural diagram of a display unit.

As shown in FIG. 7, the method for adjusting a light-transmittance of the display unit 1 may comprise, but not limited to A display unit 1, having a first side and a second side 4, is used for displaying an image; wherein, the first side 3 and the second side 4 are two opposite sides of the display unit 1, and the light-transmittance of the display unit 1 in a first direction and in a second direction is higher than a predefined light-transmittance; the first direction is the direction from the first side 3 to the second side 4, the second direction is the direction from the second side 4 to the first side 3.

The first adjusting unit 2 may be provided on the first side 3 or the second side 4 of the display unit 1, for switching from the first operation mode to the second operation mode, wherein, in the first operation mode, the first adjusting unit 2 has a first light-transmittance, and in the second operation mode, the first adjusting unit having a second light-transmittance; the first high light-transmittance is higher than the second light-transmittance.

The positional relationship between the display unit 1 and the first adjusting unit 2 is not limited in this embodiment, and may be set according to an actual need, for example, the first adjusting unit 1 may be provided outside of the display unit 2, or may be provided inside of the display unit 2, etc., which is specifically described here.

The first adjusting unit 2 can adjust the light-transmittance, i.e. adjust the light-transmittance of the display unit 1, through a received switching command.

As one implementation of this embodiment, the first adjusting unit 2 may be a liquid crystal display panel, or a film, etc., such as a PDLC (Polymer Dispersed Liquid Crystal) thin film.

Further, the display unit 1 also may comprise two adjusting units, which are located at the first side 3 and the second side 4 of the display unit 1, respectively.

The method for adjusting the light-transmittance of the display unit, as well as the first adjusting unit, are not limited in this embodiment, and may be set according to an actual need, which is specifically described here.

After adopting the above technical schemes, when the electronic device obtains the luminance of the current scene, and judges that the light-transmittance of the display unit is higher than the predefined light-transmittance, and the luminance in the current scene is higher than the predefined luminance, then the electronic device is switched from the first operation mode to the second operation mode; wherein, the first high light-transmittance in the first operation mode is higher than the second light-transmittance in the second operation mode; that is, in the first operation mode, when the light-transmittance of the display unit is higher than the predefined light-transmittance, and the luminance in the current scene is higher than the predefined luminance, then the light-transmittance of the display unit may be reduced, thereby enhancing the display effect of the electronic device.

This embodiment provides another operation mode switching method, and the method is a development of the method shown in FIG. 5, and the method can be used in application situations as follows the space attitude of the electronic device may change, and the light-transmittance of the display unit required in a different space attitude may vary; therefore, according to the space attitude of the display unit detected by a space attitude sensor in current state, the state of the electronic device can be switched, that is, the light-transmittance of the display unit can be adjusted.

This embodiment provides another operation mode switching method, the method for the further expansion of the method shown in FIG. 5, and the method of application scenarios can be the spatial attitude of the electronic device may change a different desired spatial attitude The space under the current state of the rate may vary the light transmittance of the display unit of the display unit, therefore, the electronic device can be detected based on the posture sensor space attitude switch the state of the electronic device, i.e. to adjust the rate of the light transmittance of the display unit.

For example, if the display unit is changed from the vertical to the horizontal direction (the user may be, but are not limited to, the electronic device is placed on the desktop (or handheld, etc.) to be viewed), from the high rate of light transmission of the display unit in order to avoid making transparent over screen affect the effect of the display screen of the display unit, when the spatial attitude of the display unit is changed, the display is also a corresponding change of the transmittance of the cell. Can also be that when the user uses the electronic device for reading (which may be a display unit is placed horizontally), the display unit of the transmittance decreased; When the user carries the mobile phone walking (which may be a display unit is placed horizontally) can be does not change the light transmittance of the display unit. Thereby enabling the user in the walking process, while watching the screen, can meet the constant light transmittance (transparent/translucent) of the display unit; see the screen after the actual scene, such as road conditions, so as to enhance the user in the traveling personal safety in the process.

Figure 8:
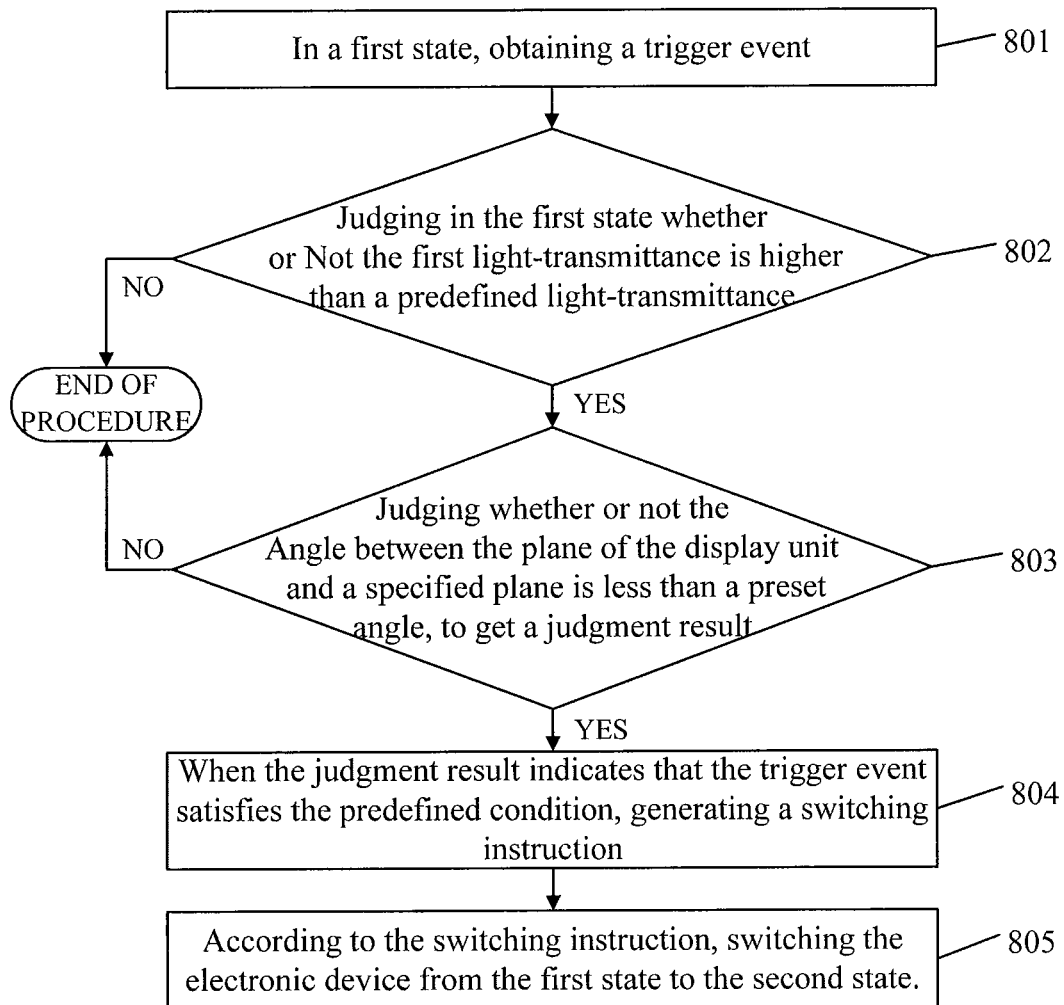
FIG. 8 is a flowchart of an operation mode switching method in an embodiment of the present invention, in which a trigger event is a space attitude sensor detects a space attitude of the display unit in a current state.

Shown in FIG. 8, the method may include

801, in the first mode of operation, access to the trigger event.

As an example of an embodiment of the present embodiment, the electronic device may include the spatial attitude sensor, specifically the space attitude of the sensor with the display unit provided corresponding, for example, and the display unit provided in correspondence gyroscope or gravity sensor, etc., the trigger events can be but not limited to the spatial attitude sensor detects the posture of the current state of the unit space. For example, the display unit is placed vertically and the display unit is placed horizontally.

This embodiment, limited space attitude sensor can be set according to the actual needs, not repeat them here.

802, it is determined in the first mode of operation, the first transmittance is higher than a predetermined light transmittance. If above, then perform step 803; if not higher than, the end of the flow.

If less than 803, display unit where the plane and specify the angle between the plane is less than a preset angle, the judgment result of the spatial attitude judgment, to meet the preconditions; if not less than, not meet preset conditions. If satisfied, then perform step 804; if not satisfied, then the process ends.

Specified plane as an embodiment of the present embodiment, but is not limited to the horizontal plane, the preset angle can be but is not limited to 45 degrees. When the display unit is placed from the vertical direction is converted to the horizontal direction is placed, can reduce the light transmittance of the display unit.

Further, when the display unit for the side of the display screen upward and to the side in a vertical direction with the vertical direction an angle less than 45 degrees, can reduce the light transmittance of the display unit.

Further optional, it is determined whether the trigger event to meet the predetermined condition can also be, but are not limited to, the following if greater than the preset condition is satisfied according to the spatial attitude determines whether the angle of the plane of the unit is located with the specified plane is greater than the preset angle;

In this scenario, the specified plane may be but is not limited to the vertical plane; the default angle can be but is not limited to 45 degrees.

804, when the determination result shows that the trigger events satisfy a predetermined condition, the switching instruction is generated.

805, according to the switching instruction, the electronic device is switched from the first operating mode to the second mode of operation, wherein the first high transmittance in the second transmittance.

Further, in the second mode of operation, the second transmittance is less than a predetermined light transmittance.

Further, the above embodiment can also be used in the following scenarios

By sensors (such as gravity sensors) the state of motion of the detecting apparatus, if the sensor detects the data indicate that the electronic device is irregular jitter (which can be electronic device is in a state of motion, i.e. can be a user carrying the electronic devices are walking), use may not use the electronic device, it can not adjust the light transmittance of the display unit, or the interpretation of the user may be edge traveling side using the transmittance of the display unit can be adjusted; When the electronic device is in a stationary state, the user may be using the electronic device, it is also possible to adjust the light transmittance of the display unit.

Alternatively, the display unit is placed horizontally and in a stationary state, the user may use the electronic device is being read or the Internet, etc., then the light transmittance of the display unit will reduce; When the electronic device is in a shake state and is placed upright, the user may not use the electronic device, then the light transmittance of the display unit can not be adjusted.

Alternatively, if the display unit as a touch screen, and when the jitter to the display unit is detected, and the display unit has been clicked, indicating that the user may use electronic equipment while traveling edge, the light transmittance of the display unit according to user requirements adjusted; when the detected The described electronic devices may not be used, and can not change the transparency of the display unit when the display unit is stationary, and the display unit is not click.

For short, can be used according to personal habits conditions and the results of the automatic adjustment device is configured so that the switching of the device can better meet the user requirements.

This embodiment can also be applied to other scenes can be set according to the actual needs, not repeat them here.

With the above program, the spatial attitude under the current state of the display unit when the electronic device is acquired, and determine a high transmittance of the display unit in a default transmission rate, and the display is less than the angle of the plane of the unit is located with the specified plane preset angle, the electronic device is switched from the first operating mode to the second operating mode, wherein the first operating mode having a first high transmittance in the second operating mode having a second transmittance; that in a first operating mode, when the first high transmittance of the display unit when the preset light transmittance, and shows the angle of the plane of the unit is located with the specified plane is smaller than a preset angle (or transparent), transmittance of the display unit can be reduced, thus increasing the display effect of the electronic device.

This embodiment provides another operation mode switching method, the method for the further expansion of the method shown in FIG. 5, and the method of application scenarios can be the electronic device can be, but is not limited to a foldable mobile phone or laptop computer, wherein, the electronic device comprises a first body and a second body, the display unit is located in the first body.

Clamshell phone lid opening with the requirements of the light transmittance of the display unit in the closed condition when the rate may be different, and can therefore be based on the positional relationship between the first body and the second body to switch the state of the electronic device of the electronic device, i.e. adjustments of the display unit transmittance.

For example, if the phone state transformation from the open state to a closing lid, can reduce the transmittance of the display unit.

Figure 9:
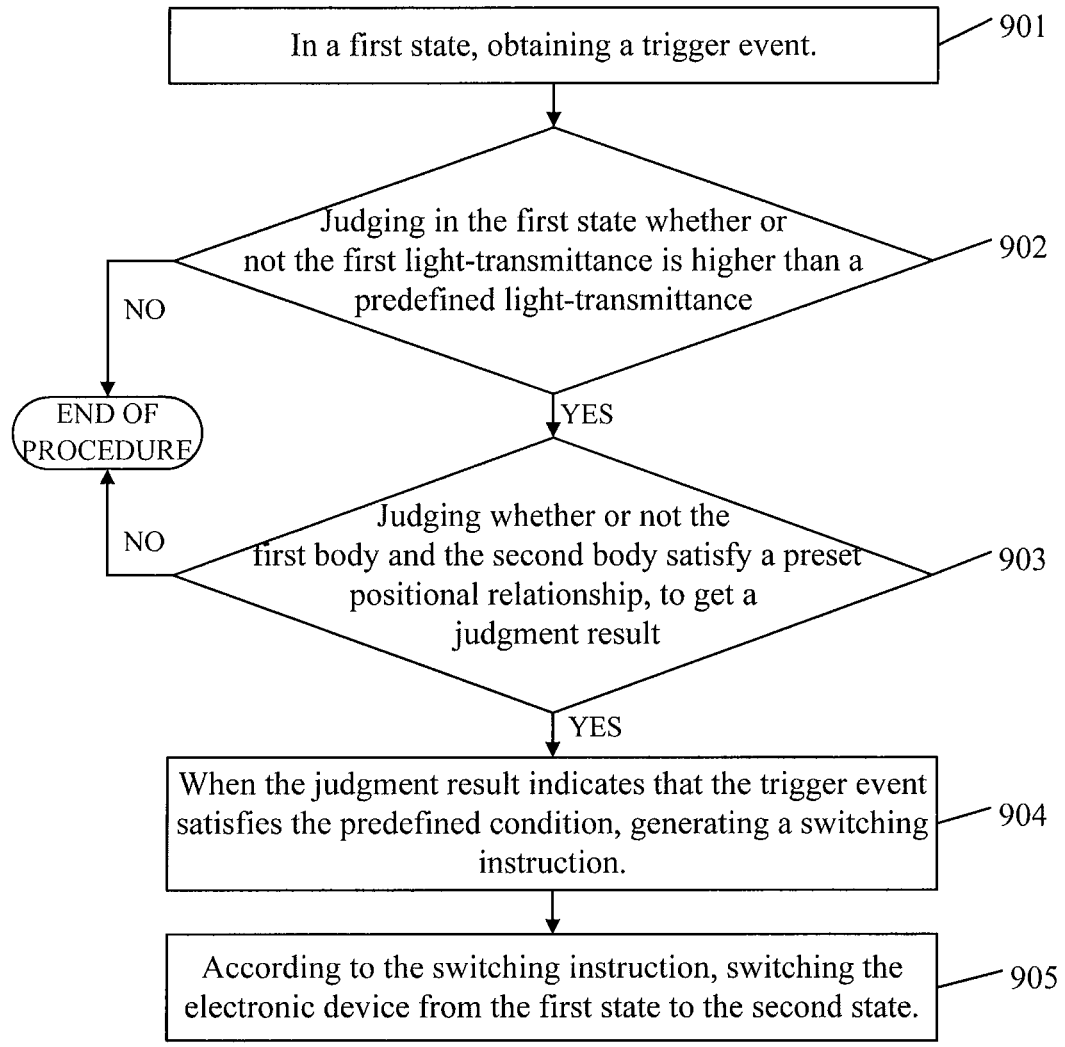
FIG. 9 is a flowchart of anther operation mode switching method in an embodiment of the present invention, in which a trigger event is a space attitude sensor detects a space attitude of the display unit in a current operation mode.

Shown in FIG. 9, the method may include 901, in the first mode of operation, the trigger event is obtained.

As one embodiment of the present embodiment, the electronic device may include a spatial attitude sensor, the triggering event can be, but is not limited to the angle between the first body and the second body detected by the spatial attitude sensor.

In this embodiment of the limited space attitude sensor, electronic equipment, and can be set according to the actual needs, not repeat them here.

Further, the triggering event can also be, but not limited to triggering the trigger switch. The trigger switch may be a physical entity, a trigger switch, may also be changing the relative position in the above embodiment, i.e. the first body and the second body, and a trigger switch. Also other forms of switch, not repeat them here.

In this embodiment, the triggering event is not limited, and can be set according to actual needs, not repeat them here.

902, it is judged in the first mode of operation, whether the first transmittance is higher than a predetermined light transmittance. If above, then perform step 903; if not the flow ends.

903, judging whether or not the first body and the second body satisfy the preset positional relationship, to obtain the judgment result; if satisfied, the preset condition is satisfied; if not satisfy, the preset condition is not satisfied. Meet preset conditions, the steps 904; if you do not meet the preconditions, the end of the process.

Further optional electronic equipment is a cell phone, when the angle between the first body and the second body is smaller than the preset angle, users may not use the phone, you can reduce the display unit transmittance; when the angle between the first body and the second body is not less than the preset angle, the user may be being used mobile phones, in a first operating mode, the light transmittance of the display unit may not be changed.

As shown in FIG. 7, the display unit may adjusts the transmission through a first adjusting unit 2, the first adjusting unit 2 may be, but is not limited to the PDLC (Polymer Dispersed Liquid Crystal, polymer dispersed liquid crystal) films.

Figure 10:
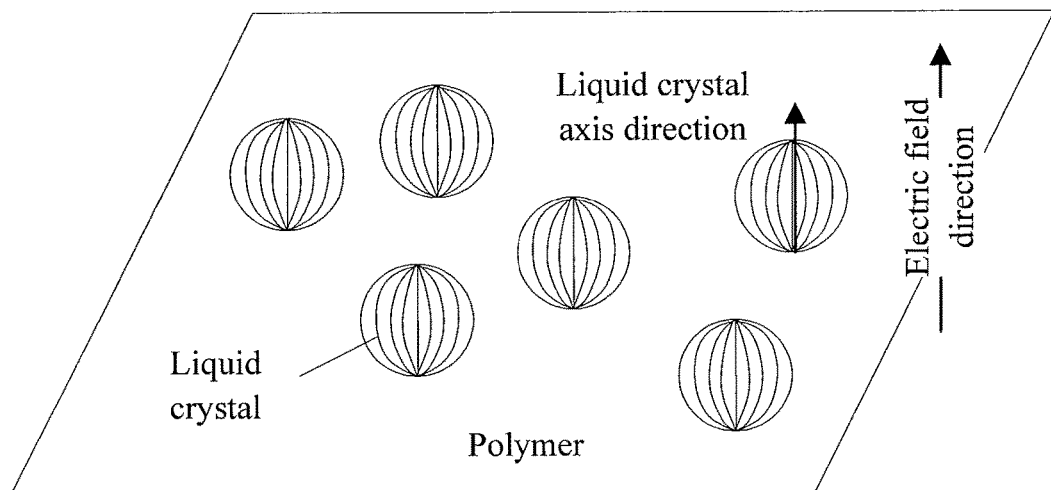
FIG. 10 is a schematic structural diagram of a film applied with a voltage, as provided by an embodiment of the present invention.
Figure 11:
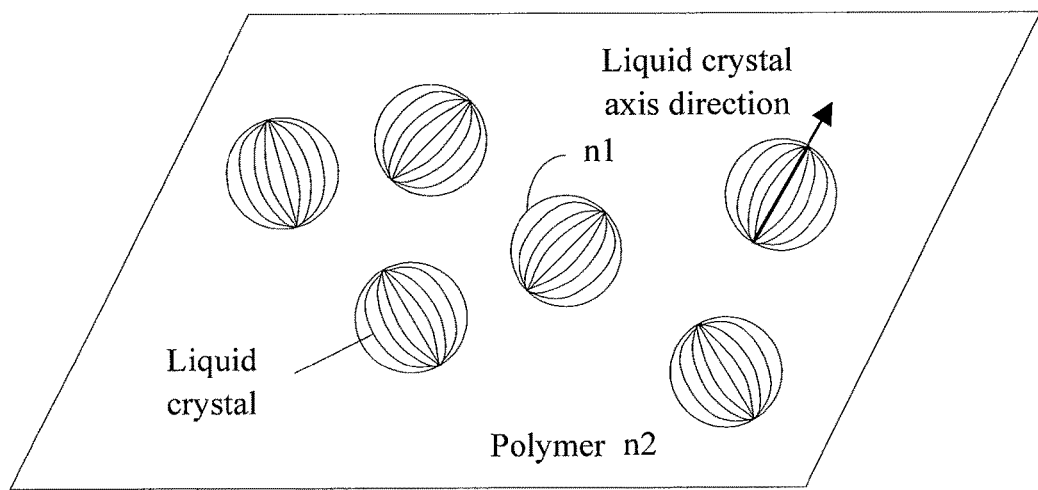
FIG. 11 is a schematic structural diagram of a film not applied with a voltage, as provided by an embodiment of the present invention.

As shown in FIG. 10, when applying a voltage to the PDLC film, the optical axis of the liquid crystal fine particles perpendicular to the surface of the PDLC film, i.e. consistent with the direction of the electric field, the liquid crystal microparticles substantially matches the optical refractive index and the refractive index of the polymer, no obvious interface constitute a substantially uniform medium, so the incident light is not scattered, and the PDLC film was transparent; shown in FIG. 11, When the PDLC film when no voltage is applied, the PDLC film does not exist between the regular electric field, the liquid crystal particles of the axis orientation random, showing the state of disorder, the refractive index n1 of the liquid crystal microparticles n2 match with the refractive index of the polymer, so that the incident light is strong scattering, PDLC film was opaque or translucent state.

Therefore, when the angle between the phone is in the closed condition (or the first body and the second body is smaller than a preset angle), reducing the light transmittance of the display unit, to reduce the voltage applied to the PDLC film, and thus the energy consumption of the mobile phone can be reduced.

Further alternatively, the electronic device also can contain the recognition unit of the human eye, the trigger event can be for the human eye recognizing unit acquiring distance display of the number of unit within a preset distance of the human eye, when the distance is displayed the unit preset distance, the human eye small quantities will be displayed in a default number (e.g. 2), the unit transmittance decreased.

Specific scene may be:

When disposed in the electronic equipment on the human eye recognition unit recognizes the human eye number is 2 or more, indicating that the user is using a electronic device for reading, Internet and other operations, and then the light transmittance of the display unit can be reduced, to enable the user to watching display unit to display a screen; When the human eye recognition unit recognizes the number of the human eye is less than 2, then the electronic device may not be used, can not change the rate of the light transmittance of the display unit.

Wherein the recognition unit of the human eye can be, but is not limited to cameras.

Recognition unit of the human eye to recognize human eye number of methods, the present embodiment is not limited to, well known to those skilled in the art of the technology in this omitted.

Further optionally, the electronic device can also be a slide-type mobile phone.

If the electronic device is a slide-type mobile phone, the triggering event can be, but is not limited to the proportion of the overlap between the spatial attitude sensor detects the first body and the second body.

When the proportion of the overlap between the slider-type mobile phone received the first body and the second body is larger than the preset ratio, the user may not use the phone, the light transmittance rate of the display unit in the first mode of operation can be reduced; when is less than the preset ratio, the proportion of the overlap between the first body and the second body of the slide-type closing phone user may be using a mobile phone, the light transmittance of the display unit can be the same in the first mode of operation.

Worthy of note is that this embodiment is not limited to these two scenes, and other scenes are not discussed here.

904, when the determination result shows that the trigger events satisfy a predetermined condition, the switching instruction is generated.

905, according to the switching instruction, the electronic device is switched from the first operating mode to the second operating mode.

Further, in the second mode of operation, the second transmittance is less than a predetermined light transmittance.

With the above program, the light transmittance of the display unit when the electronic apparatus gets to the spatial attitude under the current state of the display unit, and determine a high transmittance in a default, and the display unit of the first body and the second body meets a preset positional relationship when the electronic device is switched from the first operating mode to the second operating mode, wherein the first operating mode having a first high transmittance in the second operating mode having a second transmittance; That is, In the first mode of operation, when the first high transmittance of the display unit at a preset light transmittance, and the display unit of the first body and the second body to meet the preset positional relationship, it can reduce the light transmittance of the display unit rate, thereby increasing the effect of the display of the electronic device.

Figure 12:
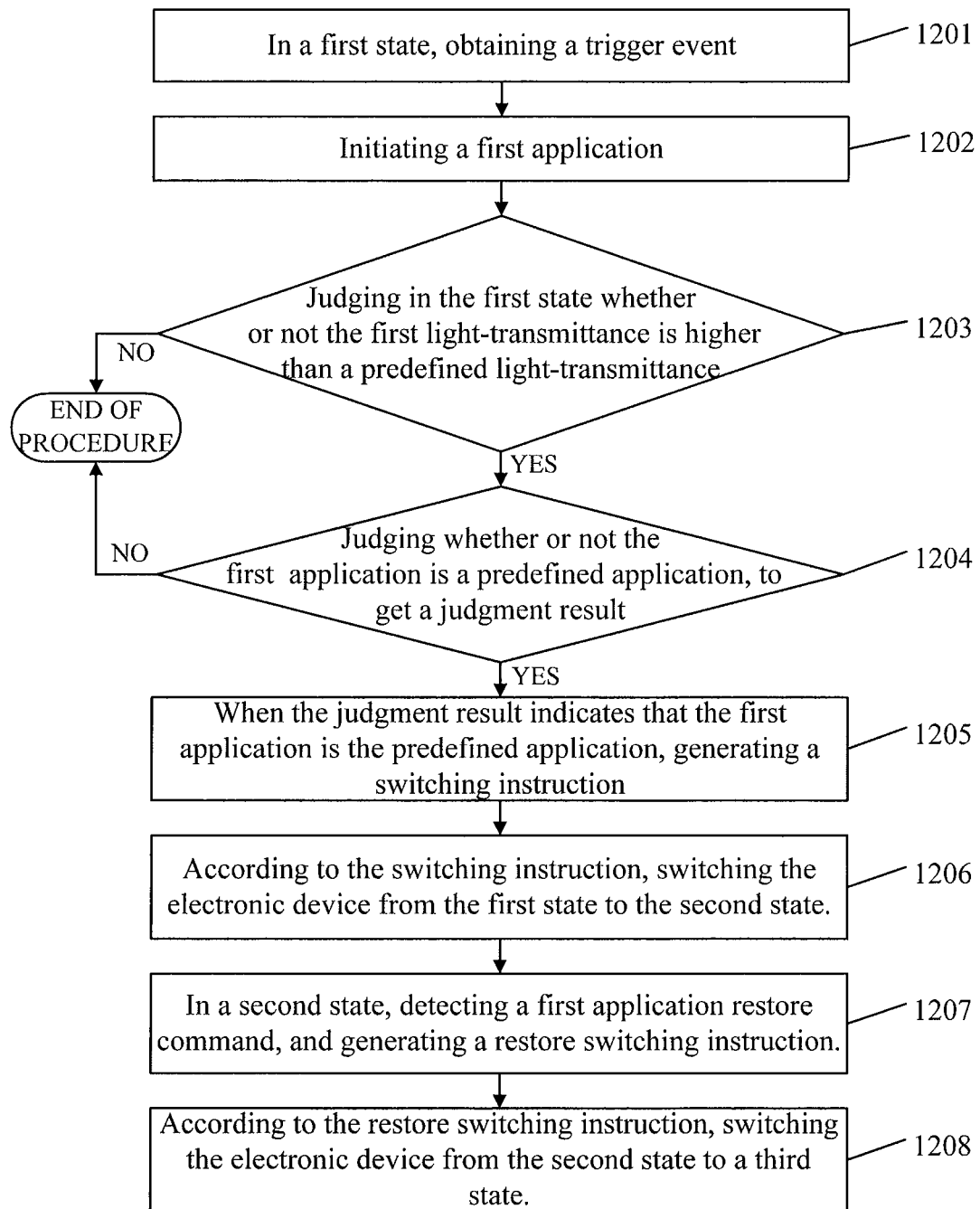
FIG. 12 is a flowchart of an operation mode switching method in an embodiment of the present invention, in which a trigger event is detecting a first application trigger command.

This embodiment provides another operation mode switching method, as shown in FIG. 12, may include:

1201, in the first operating mode, a first application of the detection trigger command.

The present embodiments are not limited, to the first application of this well known by those skilled in any application, and will not repeat them here.

1202 to start the first application.

1203, it is determined in the first mode of operation, the first transmittance is higher than a predetermined light transmittance. If above, is executed to step 1204; if not higher than, the end of the flow.

1204 determines the first application for the intended application, to obtain the result of the judgment. If so, then the preset condition is satisfied; if the preset condition is not satisfied; if satisfied, perform Step 1205; if not satisfied, then the process ends.

As one embodiment of the present embodiment, the electronic device may further include image acquisition unit.

Further, the predetermined application can be, but is not limited to the application of the start of the image acquisition unit.

As one embodiment of the present embodiment, when the electronic device starts photographic applications, for the image acquisition unit can be better display screen acquisition, to reduce the light transmittance of the display unit.

1205, when the determination result indicates that the predetermined application when the first application is to generate a switching instruction.

1206, according to the switching instruction, the electronic device is switched from the first operating mode to the second mode of operation, and the results of running of the first application in the second mode of operation is displayed by the display unit.

1207, in the second operation mode, detects the first application restore command, and generating the reduced switching instruction.

1208, according to restore switching command, the electronic device is switched from the second operating mode to the third state.

Further, the electronic device further having a third state, in the third state, the display unit has a third light transmittance, and the third high transmittance in the second transmittance.

As one embodiment of the present embodiment, when the close photographic applications (or photographic applications to switch to the background), the display unit can be adjusted from the ground children transmittance back to the first transmittance. Alternatively, the display unit is adjusted from the first a light transmittance to the transmittance specified by the user.

Worthy of note, the present embodiment is based on a predetermined application to start the application of the image acquisition unit will be described as an example, therefore, when the startup default application, to reduce the light transmittance of the display unit; further optionally, when the default applications for other applications, can also increase the rate of the light transmittance of the display unit.

This embodiment are not limited to, the third transmittance set can be set according to actual needs, for example, can be set as the default, or user, are not discussed here.

The trigger events are provided by the above-described embodiment is used to trigger the higher light transmittance rate of the display unit, in accordance with the above-mentioned embodiment of the method, the trigger event may also be used to trigger an event is used to trigger the reduced light transmittance of the display unit, this will not repeat them.

After using the above programs, the default application, when the start of the electronic device, and determine a high transmittance of the display unit at the preset light transmittance, the electronic device is switched from the first operating mode to the second operating mode, wherein the first The mode of operation having a first high transmittance in the second operating mode having a second transmittance; That is, in the first operating mode, when the first high transmittance of the display unit in the default transmittance and start the default application, you can reduce the transmittance of the display unit, thereby increasing the effect of the display of the electronic device.

In addition, if not using the present embodiment, in the use of a larger display unit of the electronic device contains transmittance photographed, since the display unit transparent, and is therefore not the image acquisition unit collection to the screen display on the display unit. Originally hoped to shoot when the user triggers the photographing is the unit real scene seen through the transparent display, but because of the uncertainty of the relative positional relationship of the user and the electronic device, and therefore the real scene seen by the different positions actually different. Electronic equipment does not really know the user to see the real scene, image acquisition unit acquisition often have a certain percentage of the deviation and users to watch the scene, under special circumstances, the deviation is likely to exceed 50%, so this embodiment has a transparent display unit of electronic equipment, will result in the screen and the user acquired by the image acquisition unit to be viewed through the transparent screen image inconsistent, leading to shoot the screen is not accurate, and thus can not meet the basic expectations of the user.

With the present embodiment, the camera/camera application triggered by the icon operation or the key operation, the user can run of the camera/camera application in the electronic device, and at the same time the trigger will reduce the light transmittance of the display unit, and on the display unit display the results of the camera/camera applications, the upcoming real-time image acquisition unit acquisition to the screen as the camera preview image is displayed in real time on the display unit. In this way, you can make the user can not see the real scene through the display unit, and allows users to viewing the implementation of the preview image acquisition to image acquisition unit to fundamentally solve the problem of inconsistent user expectations images and photographs image, increasing the accuracy of the image shoot.

Figure 13:
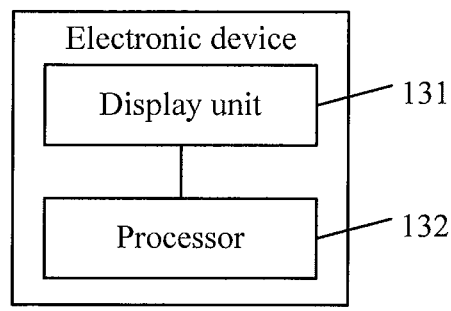
FIG. 13 is a schematic structural diagram of an electronic device provided by an embodiment of the present invention.

This embodiment provides an electronic device, as shown in FIG. 13, which may include:

A display unit 131, the electronic device has a first operation mode and a second operation mode, in the first operation mode, the display unit has a first transmittance, and in the second operation mode, the display unit has a second transmittance, and the first transmittance is higher than the second transmittance;

The electronic device further comprising:

Processor 132 in the first operation mode, gets the trigger event, judges whether the trigger event satisfies a predetermined condition to obtain the result of the judgment; generates switching instruction when the determination result shows that the trigger event satisfies a predetermined condition; based on the switching instruction, the electronic device is switched from the first operation mode to the second operation mode.

Using the above program, when the processor acquires the trigger event which meets a preset condition, then the electronic device is switched from the first operation mode to the second operation mode, wherein the first operation mode and the second operation mode have different transmittance, the processor may adjust the transmittance of the display unit according to the trigger event. That is, when the electronic device performs different operations, the transmittance of the display unit can be adjusted accordingly which improves the display effect of the electronic device.

Figure 14:
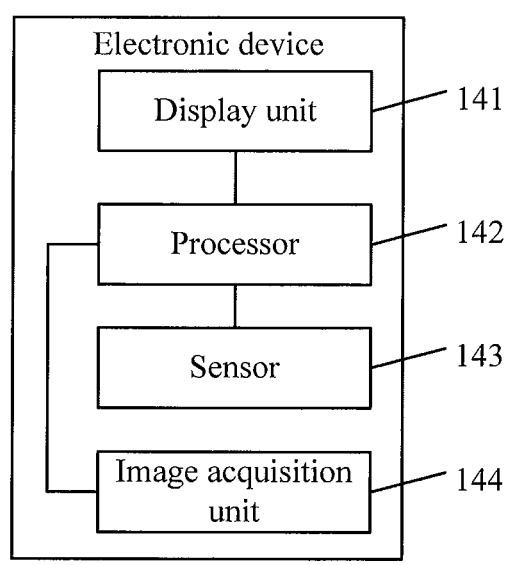
FIG. 14 is a schematic structural diagram of an electronic device provided by another embodiment of the present invention.

Another electronic device of the present embodiment that is further extended from the electronic device shown in FIG. 13, as shown in FIG. 14, may include:

A display unit 141, the electronic device has a first operation mode and a second operation mode, in the first operation mode, the display unit has a first transmittance, and in the second operation mode, the display unit has a second transmittance, and the first transmittance is higher than the second transmittance;

The electronic device further comprising:

Processor 142 in the first operation mode, gets the trigger event, judges whether the trigger event satisfies a predetermined condition to obtain the result of the judgment; generates switching instruction when the determination result shows that the trigger event satisfies a predetermined condition; based on the switching instruction, the electronic device is switched from the first operation mode to the second operation mode.

Further, the processor 142 is also used for the judgment in the first operation mode, whether the first transmittance is above a predetermined transmittance; in the first mode of operation, the first transmittance is higher than a predetermined transmittance, it is determined that the trigger event satisfies a predetermined condition to obtain the result of the judgment;

In the second mode of operation, the second transmittance is lower than a predetermined transmittance.

Further, the electronic device further comprises a sensor 143; sensor 143 may be, but is not limited to a brightness sensor, and the trigger event is that the brightness sensor detects the brightness of the current scene;

Processor 142 is also used to determine whether the brightness is higher than the preset brightness, if higher, the preset condition is satisfied.

Further, the sensor 143 may be, but is not limited to the space attitude sensor; trigger event is that the spatial attitude sensor detects the display unit 141, the current state of the spatial attitude state, or the state of motion of the electronic device.

Further, the processor 142 is also used to judge whether the angle between of the plane of the spatial attitude state determining unit 141 and a specified plane is smaller than a preset angle. The processor 142 is also used to determine whether the range of motion and the law of motion of the electronic equipment according to the space attitude sensor indicates that the device is irregular jitter states. Of course also may be not in the irregular shake state, the preset condition is satisfied.

Further, the electronic apparatus comprises a first body and a second body, the display unit 141 is located in the first body;

Processor 141 is also used for judging whether the first body and the second satisfy the relationship of the preset positions; if met, then the preset condition is satisfied.

Specifically, if the electronic device is a clamshell mobile phone, the processor 142 can determine the angle between the first body and the second body is smaller than a preset angle, if less than the preset condition is satisfied; if the electronic device for sliding The cap-type mobile phone, the processor 142 may determine whether the proportion of the overlap between the first body and the second body is larger than the preset ratio, if greater than the preset condition is satisfied.

Further, the processor 141 also is for detecting a first application trigger command; determining whether the first application is the intended application, obtaining the determination result; when the determination result indicates that the first application is the predetermined application, to generate a switching instruction.

Further, the processor 142 also may contain recognition unit of the human eye, when the human eye recognition unit recognizes the number of the human eye is greater than or equal to 2, the preset condition is satisfied.

Further, the processor 141 is also used to start the first application; based on the switching instruction, the electronic device is switched from the first operating mode to the second mode of operation, and displays the running results of the first application by the display unit in the second operation mode.

Further, the electronic device further comprises the image acquisition unit 144; a predetermined application is a start application of the image acquisition unit.

Further, the electronic device further has a third state, in the third state, the display unit 141 has a third light transmittance, the third transmittance is higher than the second transmittance;

The processor 142, is also used in the second operation mode, detects the first application restore command, and generates the restore switching instruction; according to restore switching command, the electronic device is switched from the second operation mode to the third state.

Hereinafter, with reference to FIG. 15, the display processing method of the embodiment of the invention will be described.

First, at the start of the display processing method of the embodiment of the invention, in step 1501, the display processing method detects a first gesture on the electronic device performed by the user. Specifically, the display processing method, for example, detects the first gesture by the touch unit.

Next, at step 1502, the display processing method judges whether the first gesture satisfies a first condition.

Specifically, in one embodiment, the display processing method to determine whether the first gesture operation is formed by the continuous curve trajectory, which is formed by coming and going between a first sliding direction and a second sliding direction. The number of the touch point may be one, or can be multiple. That is, the display processing method to determine whether the first gesture operation is similar to the so-called back and forth gesture, and the user can use a pointing (e.g., finger) to make the gesture, or can be make the same gesture using a plurality of pointing objects (for example, multi-fingers).

In another embodiment, the display processing method to determine whether the first gesture operation is formed of the touch point trajectory by several times in the same sliding direction of the sliding piece in the predetermined time interval, the locus which is formed in the track. For example, the sliding direction may be an arbitrarily set direction. The number of the touch point may be one, or can be multiple. That is, the display processing method to determine whether the first gesture operation is similar to the so-called back and forth gesture, and the user can use a pointing (e.g., finger) to make the gesture, or can be make the same gesture using a plurality of pointing objects (for example, multi-fingers).

Of course, the above embodiments are only examples. One skilled in the art can understand that the display processing method of an embodiment of the present invention can set other criterion as the first condition. Alternatively, the first condition corresponding to the trajectory is formed by trajectory which conforms to the user's habit.

Next, when the first gesture operation does not satisfy the first condition, the display processing method ends.

On the other hand, when the first gesture operation satisfies the first condition, the display processing method proceeds to step 1503.

At step 1503, the display processing method obtains a first adjustment parameter. Wherein the first adjustment parameter is used to adjust the parameters of the image in a first adjustment direction. The adjustment parameters is, for example, the electronic device's transparency, brightness, etc. The first direction of adjustment, for example, is one of the increasing direction and the decreasing direction. Here, the direction for increasing is assumed. For example, in the case of brightness, the first adjustment parameter may be a brightness increase amount.

In one embodiment, the display processing method, according to the first gesture operation, obtains a fixed first adjustment parameter. I.e., in the above case, for example, whatever the track of the first gesture operation is, as long as it satisfies the first condition, the display processing method obtains identical first adjustment parameters.

In another embodiment, the first adjustment parameters may be variable. Specifically, the display processing method, according to the first gesture operation, determines the size of the first adjustment parameter.

More specifically, in the case of the judgment formed by the touch point in the operation in the first gesture trajectory is a continuous curve trajectory is formed on the first sliding direction, and with the first sliding direction, different from the second sliding direction of roundtrip. Next, the display processing method can be continuous curve track back and forth in the first sliding direction, and the second sliding direction by calculating the round-trip times, to determine the corresponding first adjustment parameter. For example, the display processing method may be designed such that the number of reciprocations more the larger the first adjustment parameter.

As another example, in the judgment of the first gesture operation is formed by the touch-point trajectory is case several times in the same sliding direction, the sliding piece trajectory of the track formed by a predetermined time interval, the display processing The method can determine by calculating the number of segments of the track multipiece track corresponding to a first adjustment parameter. For example, the display processing method may be designed such that the number of segments, the first adjustment parameter bigger.

Thereafter, in step 1504, the display processing method obtains the image information of the displayed image. The image information is required to display the image.

Further, it should be noted that, although in the flowchart in step 1504 is shown as after step 1503, however, the skilled in the art can understand, the step 1504 and the step 1503 may be executed in parallel, or in reverse order.

Next, at step 1505, the display processing method, according to the first adjustment parameters and the image display, processes the image to generate a first adjustment image.

More specifically, for example, in the case of brightness, the display processing method adjusts the brightness of the image based on the first adjustment parameter and the image information to generate the first adjustment image after brightness adjustment. In the case of transparency, the image display processing method adjusts the transparency of the image based on the first adjustment parameter and the image information to generate the first adjustment image after the transparency adjustment.

The processing method to adjust image processing skilled in the know, this will not elaborate.

Thereafter, in step 1506, the display processing method displays the first adjustment image.

Thus, the display processing method of the embodiment of the invention allows the user to adjust the parameters of the image displayed on the electronic device by the gesture operation which conforms to the user's habits, makes it easy to be learned by the user, makes the user operation simple, and thus greatly improve the user experiences.

In addition, further, in another embodiment of the present invention, the display processing method can not only adjust the image in the first adjustment direction, but also can adjust in the second adjustment direction.

In this case, the display processing method detects the second gesture on the electronic device operation performed by the user. Specifically, the display processing method, for example, detects the second gesture by the touch unit.

Next, the display processing method judge whether the second gesture operation satisfies the second condition. The second condition and the first condition are different. Alternatively, the second condition, the first condition, although different, but are the corresponding conditions. For the user, i.e., the first gesture operation satisfying the first condition and the second gesture operation satisfying the second condition belong to the same operation style gesture.

Specifically, in one embodiment, the display processing method determines whether the touching point's trajectory of the second gesture operation is formed by the continuous curve trajectory, which is formed by coming and going between a third sliding direction and a fourth sliding direction different from the third sliding direction. For example, the third sliding direction is the direction towards the upper side of the display unit, and the fourth sliding direction is the direction towards the lower side of the display unit. The number of the touch point may be one, or can be multiple. That is, the display processing method to determine whether the second gesture operation is similar to the so-called back and forth gesture, and the user can use a pointing (e.g., finger) to make the gesture, or can make the same gesture using a plurality of pointing objects (for example, multi-fingers).

In another embodiment, the display processing method to determine whether the first gesture operation is formed of the touch point trajectory by several times in the same sliding direction of the sliding piece in the predetermined time interval, the locus which is formed in the track. For example, the sliding direction may be an arbitrarily set direction. The number of the touch point may be one, or can be multiple. That is, the display processing method to determine whether the first gesture operation is similar to the so-called back and forth gesture, and the user can use a pointing (e.g., finger) to make the gesture, or can be make the same gesture using a plurality of pointing objects (for example, multi-fingers).

Of course, the above embodiments are only examples. One skilled in the art can understand that the display processing method of an embodiment of the present invention can set other criterion as the first condition. Alternatively, the first condition corresponding to the trajectory is formed by trajectory which conforms to the user's habit.

Next, when the second gesture operation does not satisfy the second condition, the display processing method ends. On the other hand, when the second gesture operation satisfies the second condition, the display processing method obtains the second adjustment parameter. The second adjustment parameter is used to adjust the parameters of the image in the second adjusting direction. The second adjusting direction and the first adjustment direction are opposite, i.e., for example, one of the increasing direction and the decreasing direction, here assumed to be decreasing direction. For example, in the case of brightness, the second adjustment parameter can be the luminance reduction amount.

In one embodiment, the display processing method may operate, according to the second gesture, to obtain a fixed second adjustment parameter. I.e., in the above case, for example, whatever the track of the second gesture operation is, as long as it satisfies the second condition, the display processing method obtains the same second adjustment parameter.

In another embodiment, the second adjustment parameter may be variable. Specifically, the display processing method may operate according to the second gesture, to determine the size of the second adjustment parameter. Processing is similar with that with reference to FIG. 15, which will not be described in detail here.

Similarly, on the other hand, the display processing method obtains the image information of the displayed image, and processes the image according to the second adjustment parameter to generate a second adjustment image, and display the second adjustment image.

Thereby, the display processing method of the embodiment of the invention allows the user to be able to adjust the parameters of the image displayed on the electronic device in two adjustment directions, thereby the users easily learn and master, so that the user operation is simple, which further improves the user experience.

Further, in another embodiment, the parameters of the image have an upper limit and a lower limit. The display processing method can be in operation when the first condition is met, determines whether the displayed image parameter has been reached the limit corresponding to the first adjustment parameter which is one of the upper and the lower limit. When the image parameter has reached the limit corresponding to the first adjustment parameter which is one of the upper and the lower limit, the display processing method maintains the display of the image without the adjustment.

Namely, in this embodiment, in the case of brightness, for example, the display processing method in the first gesture operation when the first condition is satisfied, judges whether the luminance value of the judgment of the image has reached the upper limit of brightness. When the brightness of the image has reached the upper limit, the display processing method maintains the display of the image without adjusting brightness.

Similarly, in the embodiment described above, the display processing method may be operated in the second gesture when the second condition is satisfied, and determines whether the parameter has reached the upper limit of the lower limit. When the parameter of the image has reached one of the upper and the lower limit, the display processing method maintains the display of the image without adjusting.

The display processing method in the second gesture operation satisfies the second condition, judging whether the brightness of the image has reached the lower limit of luminance. When the brightness of the image has reached the lower limit of luminance, and to maintain the display of the image of the display processing method without adjusting.

Thus, the display processing method of the embodiment of the invention allows the user through the gesture operation habits, within a reasonable range appropriately adjusting the parameters of the image displayed on the electronic device, thereby easily the user to learn and master, so that the user operation is simple further improve the user experience.

Figure 15:
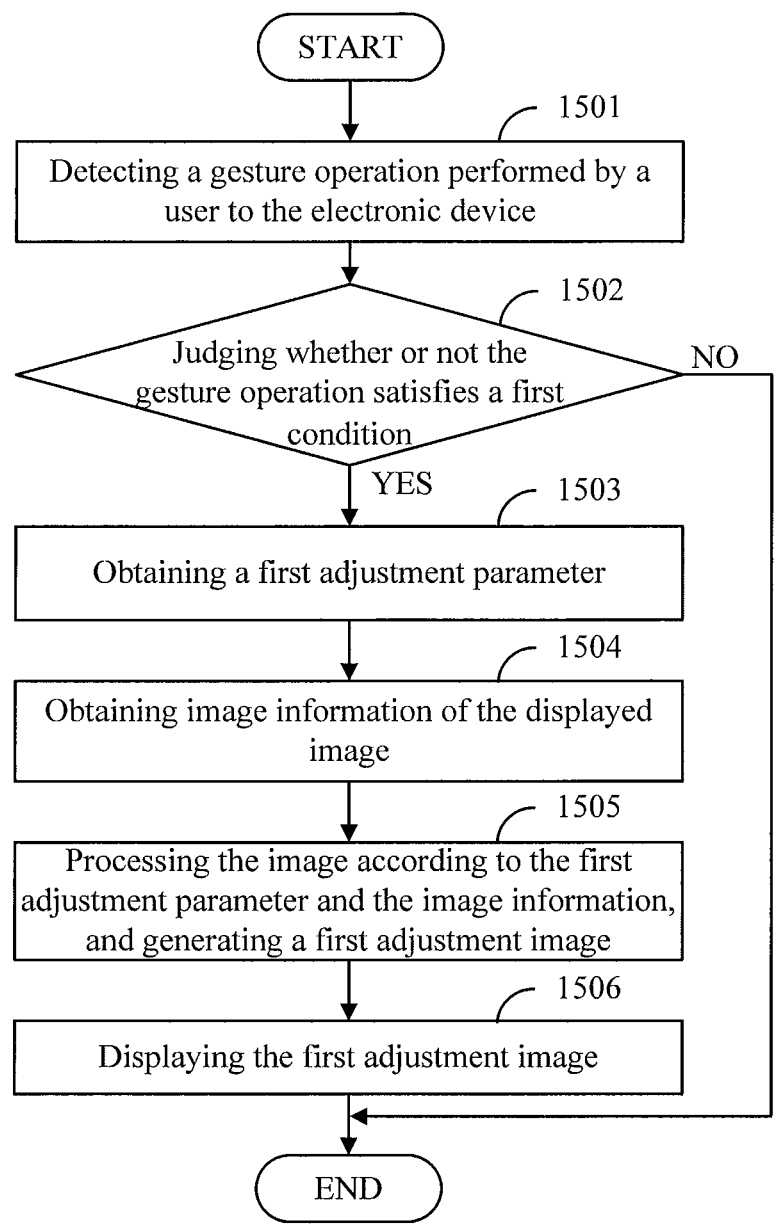
FIG. 15 is a flowchart illustrating a display processing method in accordance with an embodiment of the present invention.

The above, with reference to FIG. 15, describes a display processing method of an embodiment of the present invention.

Hereinafter, with reference to FIG. 16, a display processing apparatus of an embodiment of the present invention will be described.

The display processing apparatus of the embodiment of the invention is applied to an electronic device. The electronic device has a display unit for displaying images. The electronic device also has a touch unit for detecting a user's gesture operation. Alternatively, the touch unit and the display unit are laminated to form a touch screen.

In addition, the display of the touch screen may be based on total reflection type screen, and may be based on the transflective type. That is, the touch screen may have a predetermined transmittance or adjustable transmittance. Thus, in the case of a low transmittance, the user can only see the image through the touch screen. In the case of a high transmittance, the user can also see through the touch screen of the image and the touch screen after the photographed image of the real world. The transflective screen design is well known by those skilled in the art, which will be not described in detail.

Figure 16:
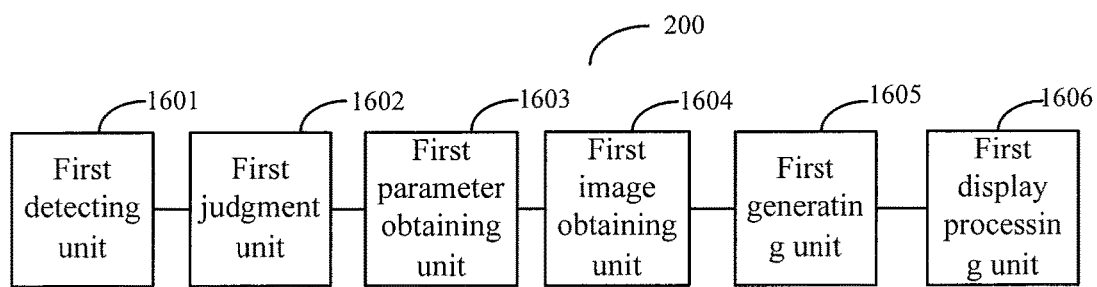
FIG. 16 is a block diagram illustrating a main configuration of a processing device in accordance with an embodiment of the present invention.

As shown in FIG. 16, a display processing apparatus 200 of the embodiment of the present invention may have a first detection unit 1601, the first judgment unit 1602, the first parameter obtaining unit 1603, the first image obtaining unit 1604, the first generating unit 1605 and the first a display processing unit 1606.

The first detection unit 1601 detects a first gesture operation on the electronic device performed by a user.

The first judgment unit 1602 determines whether the first gesture operation satisfies a first condition.

The first parameter obtaining unit 1603 obtains a first adjustment parameter and when the first gesture operation satisfies a first condition, the first adjustment parameter is used for adjusting the parameters of the image in the first adjustment direction.

The first image capturing unit 1604 obtains the image information of the displayed image.

The first generating unit 1605 processes the image in accordance with the first adjustment parameter and the image display processing to generate the first adjustment image.

The first display processing unit 1606 displays the first adjustment image.

In one embodiment, the first judgment unit 1605 is configured to determine whether the touch point trajectory formed by the first gesture operation is a continuous curve trajectory, which is formed by coming and going between a first sliding direction and a second sliding direction different from the first sliding direction.

The adjustment parameters comprise at least one of transparency and brightness.

In another embodiment, the display processing apparatus 200 further comprises a second detecting unit, the second judgment unit, the second parameter obtaining unit, the second image obtaining unit, a second generating unit and a second display processing unit (not shown).

The second detection unit detects a second gesture operation on the electronic device performed by the user. The second judgment unit determines whether the second gesture operation satisfies a second condition. The second parameter obtain unit obtains a second adjustment parameter when the second gesture operation satisfies the second, wherein the second adjustment parameter is used to adjust the image in a second adjusting direction. The second image obtaining unit acquires the image information of the image displayed. The second generation unit processes the image according to the second adjustment parameter and the image display processing to generate a second adjustment image. The second display processing unit displays the second adjustment image. The second condition and the first condition are different, since the second adjusting direction is opposite to the first adjusting direction.

In another embodiment, the parameters of the image have the upper and lower limits, and the display processing apparatus 200 further comprises a third judgment unit and the third display processing unit (not shown). The third judging unit judges whether the parameter of the displayed image has reached the limit corresponding to the first adjustment parameter among the upper and lower limits when the first gesture operation satisfies the first condition. The third display processing unit maintains the display of the image, without adjusting when the parameter of the displayed image has reached the limit corresponding to the first adjustment parameter among the upper and lower limits.

The specific configuration and operation of the respective units of the display processing device 200 according to the embodiment of the invention have been described in details with reference to FIG. 15, which will no longer be repeated.

The above describes a display processing apparatus of the embodiment of the present invention, Embodiment of a display processing device by the present invention, the user is able to meet the operating habits gestures to regulate the parameters of the image displayed on the electronic device, making it easy to learn and master of the user, so that a simple user operation, thereby greatly improving the user experience.

Hereinafter, with reference to FIG. 17 the electronic device according the embodiment of the invention is describes. The electronic device is a device such as smart glasses, which can be worn by the user.

Figure 17:
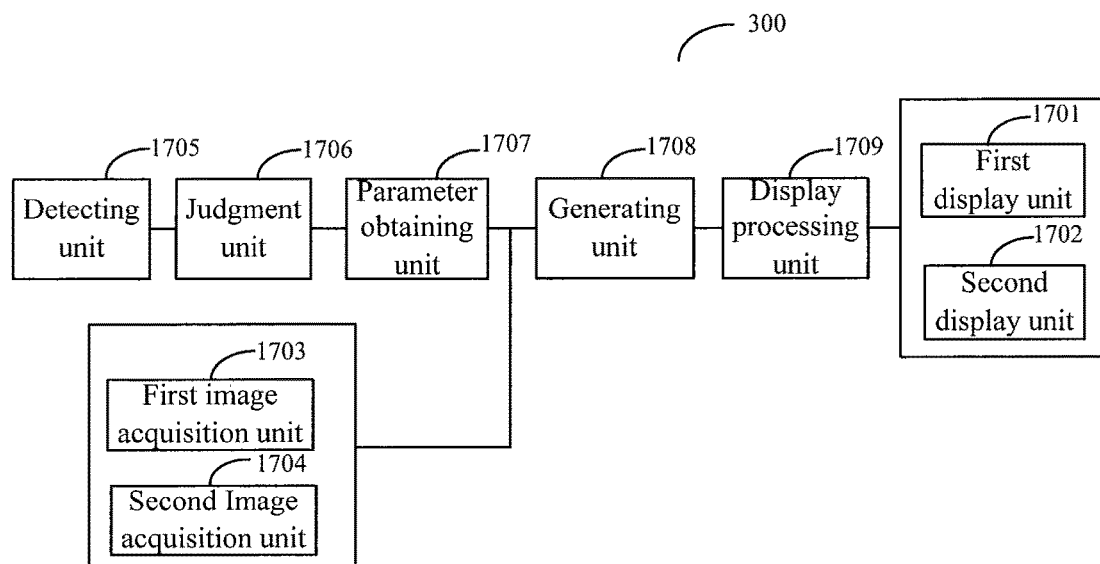
FIG. 17 is a block diagram of a main configuration of an electronic device in accordance with an embodiment of the present invention.

As shown in FIG. 17, in the present embodiment of the invention, the electronic device 300 comprises a first display unit 1701, a second display unit 1702, a first image acquisition unit 1703, a second image acquisition unit 1704, a detecting unit 1705, a determination unit 1706, a parameter obtaining unit 1707, a generating unit 1708 and a display processing unit 1709.

The first display unit 1701 satisfies a predetermined transmittance and displays the first image, and when the electronic device is worn by the user, the first display unit is located within the visible area of the user's left eye.

The second display unit 1702 satisfies a predetermined transmittance and displays the second image, and when the electronic device is worn by the user, the first display unit is located within the visible area of the user's right eye.

The first image obtaining unit 1703 is set corresponding to the first display unit to obtain the first image information of the first image displayed by the first display unit.

The second image obtaining unit 1704 is set corresponding to the second display unit to obtain the second image information of the second image displayed by the second display unit.

The detecting unit 1705 detects a first gesture operation on the electronic device performed by a user.

The gesture judgment unit 1706 judges whether the gesture operation satisfies the predetermined condition.

The parameter obtaining unit 1707 obtains the adjustment parameters when the gesture operation satisfies the predetermined condition, the adjustment parameters are the parameters used to adjust the first image and the second image.

The generating unit 1708 processes the first image according to the adjustment parameters and the first image processing and processes the second image according to the adjustment parameters and the second to generate the first adjustment image to be displayed by the first display unit and the second adjustment image to be displayed by the second display unit.

The display processing unit 1709 makes the first display unit to display the first adjustment image, and the second display unit to display the second adjustment image.

The specific configuration and operation of the embodiment of the present invention, the respective units of the electronic device 300 has been with reference to FIG. 15 in the display processing method of an embodiment of the present invention is described in detail, this is no longer repeated.

The above example describes an embodiment of the present invention, electronic equipment, for example, the electronic device of the smart glasses. However, as described above, the electronic device of the present embodiment of the invention is not limited to the above, such as mobile phones, tablet computers, personal computers and other electronic devices. In this case, the first display unit and the second display unit can be combined into one unit. The first image obtaining unit and the second image acquisition unit can be combined into one unit.

The above the electronic device according to the embodiment of the present invention is described.

The embodiment of the electronic device by the present invention, the user is able to meet the operating habits gestures to regulate the parameters of the image displayed on the electronic device, making it easy to learn and master of the user, allows the user easy operation, thereby greatly improving the user experience.

Figure 18A:
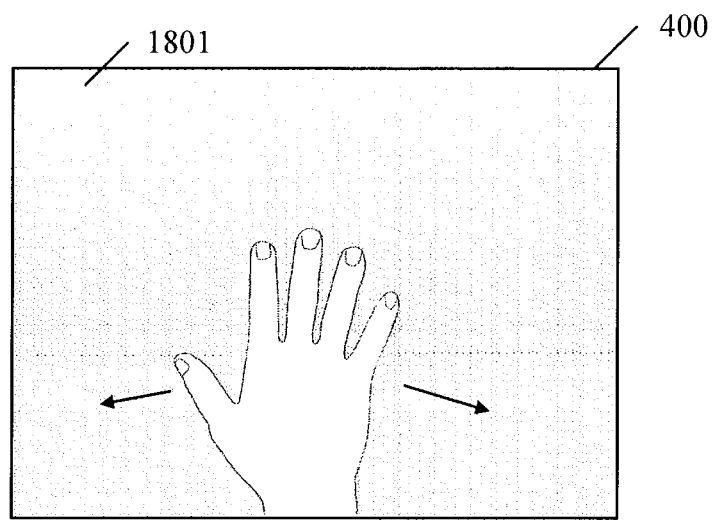
FIGS. 18A and 18B are schematic diagrams of a display on an electronic device in accordance with an embodiment of the present invention.
Figure 18B:
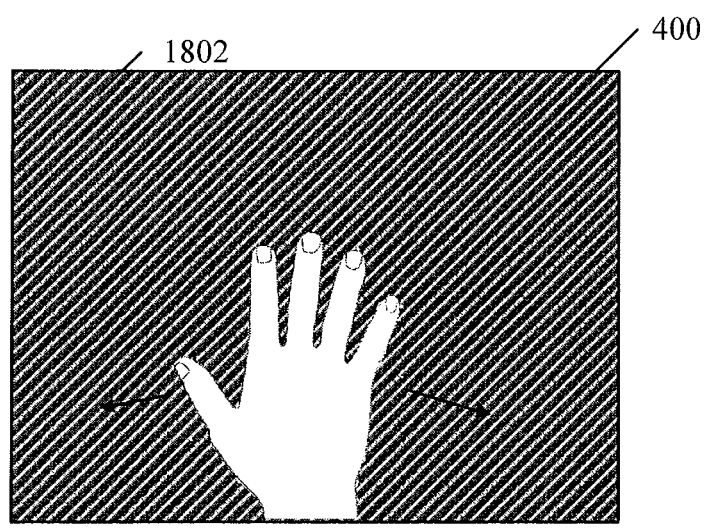

Hereinafter, with reference to FIG. 18A and FIG. 18B depicts the user through the display processing method of the present invention embodiment, the schematic diagram of display when the display processing apparatus and the electronic device operation. In the following description, the same brightness adjustment as an example. However, the skilled in the art can be understood that the invention embodiment of a display processing method, a display processing apparatus and the electronic device can also be used, such as transparency, contrast, gradation and other display parameters, and even non-display argument (such as volume, etc.) of the regulation.

FIGS. 18A and 18B are schematic diagrams of a display on an electronic device in accordance with an embodiment of the present invention. As shown in FIG. 18A, the touch screen 400 of the electronic apparatus of the embodiment of the invention displays an image 1801, the image 1801 has a first luminance (in the figure, a point-like shadows shown schematically). At this time, if the electronic device detects a gesture of sliding back and forth for example (as shown in FIG. 18A), the electronic device will obtain luminance adjustment parameters, and adjust the image according to the luminance adjustment parameters. The image after the luminance adjustment, for example, is shown in FIG. 18B. FIG. 18B shows that the image 1802 after adjustment has a second luminance (in the Figure by diagonal hatching schematically shown), the second luminance is different from the first luminance, thus a luminance adjustment is achieved.

Thus, the user is able to meet the operating habits gesture to adjust the parameters of the image displayed on the electronic device, making it easy to learn and master of the user, so that a simple user operation, thereby greatly improving the user experience.

Above with reference to FIG. 14 to FIG. 18 describes the display processing method according to an embodiment of the present invention, the display processing apparatus and electronic equipment.

Note that, in this specification, the term "comprising", "contains" or any other variant is intended to cover a non-exclusive contains, so that the process, method, article or device comprising a series of elements comprises not only those elements, but also include other elements not expressly listed or include elements inherent in this process, method, article, or equipment. In the case of no more restricted, by the statement "comprises a . . . " defining elements, does not preclude the existence of additional identical elements comprising the elements of the process, method, article or device.

In addition, a description is, like " . . . unit" in the present specification, "the second . . . the representation of the unit" only in the description easy to distinguish, and does not mean that it must be implemented as a physically separate two or more units. In fact, according to need, the unit may be integrally implemented as a unit, can also be implemented as a plurality of cells.

Finally, it should be noted that, the above series of processes comprises not only processing performed in time series in the order described herein press, and comprises a parallel or separately, instead of the processing executed in chronological order.

Through the above description of the embodiments, the skilled in the art can clearly understand that the present invention is achieved through software plus a necessary hardware platform, of course, can also be implemented entirely by hardware. Based on such understanding, the technical solution of the present invention, the background art to contribute to all or a portion may be embodied in the form of a software product, the computer software product may be stored in a storage medium, such as a ROM/RAM, disk, optical disk, etc., comprises a plurality of instructions for a method that allows a computer device (may be a personal computer, server, or network equipment, etc.) to perform various embodiments of the present invention or some portion of the embodiment.

In the embodiment of the invention, the unit/module can be implemented in software for execution by various types of processors. For example, an identification module of executable code may include one or more physical or logical blocks of computer instructions, for example, which can be constructed as an object, procedure, or function. Nevertheless, the identified module of executable code without physically located together, but may include different instructions stored in different bit on, when these instructions are logically combined together, and its constituent units/modules and achieve the unit/modules specified purposes.

Unit/module can be implemented using software, taking into account the level of the existing hardware technology, it can be implemented in software, the unit/module, in the case of not considering the cost of skilled in the art can build the corresponding hardware circuit to achieve the function corresponding to the hardware circuit comprises a conventional ultra-large scale integrated (VLSI) circuit or a gate array, such as logic chips, existing semiconductor of the transistor and the like, or other discrete components. The module may further with the programmable hardware device, such as a field programmable gate array, programmable array logic, programmable logic devices, etc. to achieve.

Above for the present invention is described in more detail, application specific example of the principles of the invention and embodiments described herein, the above description of the embodiment is only used to help the understanding of the present invention is a method and the core idea; Meanwhile, for the art of ordinary skill, based on the idea of the invention, at both vary on the specific embodiment and application range, in summary, the content of the present specification should not be understood as limiting the present invention.

The invention claimed is:

1. An operation mode switching method wherein the method is applied to an electronic device; the electronic device comprises a display unit, and the electronic device has a first operation mode and a second operation mode; the display unit has a first light-transmittance in the first operation mode and a second light-transmittance in the second operation mode; the first light-transmittance is higher than the second light-transmittance, the method comprising:

detecting to obtain a trigger event;

judging whether or not the trigger event satisfies a predefined condition, to get a judgment result;

when the judgment result indicates that the trigger event satisfies the predefined condition, generating a switching instruction;

according to the switching instruction, switching the electronic device between the first operation mode and the second operation mode;

wherein the step of detecting to obtain a trigger event is: detecting a first application trigger command;

the step of judging whether or not the trigger event satisfies a predefined condition to get a judgment result is: judging whether or not the first application is a predefined application, to get a judgment result;

the step of generating a switching instruction when the judgment result indicates that the trigger event satisfies the predefined condition is: when the judgment result indicates that the first application is the predefined application, generating a switching instruction, wherein in the first operation mode, a user can see a real scene through the display unit; and in the second operation mode, the user can see a running result of the first application displayed on the display unit and cannot see the real scene through the display unit.

2. The method according to claim 1, wherein after said step of detecting a first application trigger command, the method further comprises: starting the first application;

said step of switching the electronic device from the first operation mode to the second operation mode according to the switching instruction, comprises:
according to the switching instruction, switching the electronic device from the first operation mode to the second operation mode, and displaying the running result of the first application through the display unit in the second operation mode.

3. The method according to claim 2, wherein the electronic device comprises an image acquisition unit; the predefined application is a starting application of the image acquisition unit.

4. An electronic device, wherein the electronic device comprises a display unit, and the electronic device has a first operation mode and a second operation mode; the display unit has a first light-transmittance in the first operation mode and a second light-transmittance in the second operation mode; the first high light-transmittance is higher than the second light-transmittance;
the electronic device further comprises:
a detecting member for detecting to obtain a trigger event; and
a processing unit for judging whether or not the trigger event satisfies a predefined condition, to get a judgment result; when the judgment result indicates that the trigger event satisfies the predefined condition, generating a switching instruction; according to the switching instruction, switching the electronic device between the first operation mode and the second operation mode, detecting a first application trigger command; and judging whether or not the first application is a predefined application, to get a judgment result; when the judgment result indicates that the first application is the predefined application, generating a switching instruction,
wherein in the first operation mode, a user can see a real scene through the display unit; and
in the second operation mode, the user can see a running result of the first application displayed on the display unit and cannot see the real scene through the display unit.

5. The electronic device according to claim 4, wherein the processor is also used for starting the first application; according to the switching instruction, switching the electronic device from the first operation mode to the second operation mode, and displaying the running result of the first application through the display unit in the second operation mode.

6. The electronic device according to claim 5, wherein the electronic device further comprises an image acquisition unit; the predefined application is a starting application of the image acquisition unit.

\* \* \* \* \*